(12) United States Patent
Mizuta et al.

(10) Patent No.: US 10,899,896 B2
(45) Date of Patent: Jan. 26, 2021

(54) REINFORCING FIBER BUNDLE AND MOLDING MATERIAL

(71) Applicant: MITSUI CHEMICALS, INC., Tokyo (JP)

(72) Inventors: Yasushi Mizuta, Ichihara (JP); Takeharu Isaki, Chiba (JP); Masako Yoshida, Chiba (JP); Yuichi Itou, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/095,151

(22) PCT Filed: Apr. 19, 2017

(86) PCT No.: PCT/JP2017/015803
§ 371 (c)(1),
(2) Date: Oct. 19, 2018

(87) PCT Pub. No.: WO2017/183672
PCT Pub. Date: Oct. 26, 2017

(65) Prior Publication Data
US 2019/0135995 A1   May 9, 2019

(30) Foreign Application Priority Data

Apr. 20, 2016 (JP) ................ 2016-084856
Nov. 7, 2016 (JP) ................ 2016-217490
Mar. 13, 2017 (JP) ................ 2017-047825

(51) Int. Cl.
| C08J 5/06 | (2006.01) |
| B29B 15/10 | (2006.01) |
| B29C 70/30 | (2006.01) |
| D06M 15/227 | (2006.01) |
| C08L 23/20 | (2006.01) |
| C08L 23/26 | (2006.01) |
| C08L 23/16 | (2006.01) |
| B29B 15/08 | (2006.01) |
| B29K 23/00 | (2006.01) |
| B29K 77/00 | (2006.01) |
| B29K 307/04 | (2006.01) |
| B29L 23/00 | (2006.01) |

(52) U.S. Cl.
CPC ............. *C08J 5/06* (2013.01); *B29B 15/08* (2013.01); *B29B 15/10* (2013.01); *B29C 70/30* (2013.01); *C08L 23/16* (2013.01); *C08L 23/20* (2013.01); *C08L 23/26* (2013.01); *D06M 15/227* (2013.01); *B29K 2023/12* (2013.01); *B29K 2077/00* (2013.01); *B29K 2307/04* (2013.01); *B29L 2023/22* (2013.01); *C08J 2323/20* (2013.01); *C08J 2423/26* (2013.01)

(58) Field of Classification Search
CPC ......... B29B 15/08; B29B 15/10; B29C 70/30; D06M 15/227
See application file for complete search history.

(56) References Cited

U.S. PATENT DOCUMENTS

| 2006/0258810 A1 | 11/2006 | Sugiura et al. |
| 2009/0062426 A1 | 3/2009 | Shiraki et al. |
| 2011/0257325 A1 | 10/2011 | Asami |
| 2012/0015186 A1 | 1/2012 | Honma et al. |

FOREIGN PATENT DOCUMENTS

| JP | H-06-107442 A | 4/1994 |
| JP | H-09-257193 A | 9/1997 |
| JP | 2005-048343 A | 2/2005 |
| JP | 2010-149353 A | 7/2010 |
| JP | 2015-078331 A | 4/2015 |
| JP | 2016-006245 A | 1/2016 |
| JP | 2006-124852 A | 5/2016 |
| WO | 2006-101269 A1 | 9/2006 |
| WO | 2010-074108 A1 | 1/2010 |
| WO | 2010/074118 A1 | 1/2010 |

OTHER PUBLICATIONS

International Search Report (PCT/ISA/210) dated Jul. 4, 2017, by the Japan Patent Office as the International Searching Authority for International Application No. PCT/JP2017/015803.

Written Opinion (PCT/ISA/237) dated Jul. 4, 2017, by the Japan Patent Office as the International Searching Authority for International Application No. PCT/JP2017/015803.

*Primary Examiner* — Wenwen Cai

(74) *Attorney, Agent, or Firm* — Buchanan Ingersoll & Rooney PC

(57) ABSTRACT

Disclosed are: a reinforcing fiber bundle with excellent mechanical property and handling property, which contains a propylene-based resin (A), a propylene-based resin (B) comprising at least a carboxylic acid salt bonded to the polymer chain, and a reinforcing fiber (C) wherein the propylene-based resin (A) comprises more than 70% by mass but not more than 100% by mass of a component (A-1) having a weight average molecular weight of 150,000 or more, the amount of the propylene-based resin (B) is 3 to 50 parts by mass per 100 parts by mass of the propylene-based resin (A), and the total content rate of the propylene-based resin (A) and the propylene-based resin (B) is 0.3 to 5% by mass in the whole reinforcing fiber bundle; and a molding material comprising the reinforcing fiber bundle and a matrix resin.

17 Claims, No Drawings

REINFORCING FIBER BUNDLE AND MOLDING MATERIAL

TECHNICAL FIELD

The present invention relates to a reinforcing fiber bundle and a molding material containing this reinforcing fiber bundle and a matrix resin.

BACKGROUND ART

A fiber-reinforced thermoplastic resin molded article in which a reinforcing fiber is complexed with a thermoplastic resin is excellent in mechanical properties and dimensional stability. Therefore, it is used in a wide range of fields such as pipes, pressure vessels, automobiles, aircraft, electric and electronic equipment, toys and home appliances. A carbon fiber, a type of reinforcing fiber, has recently gained attention because it is lightweight, has high strength and has high rigidity.

On the other hand, the polyolefin-based resin, which is a hydrocarbon-based resin, is generally inexpensive, has excellent processability and chemical resistance, is hard to generate a harmful gas even when incinerated, and has excellent characteristics such as excellent recyclability. Therefore, polyolefin-based resins have attracted attention as a matrix resin of a fiber-reinforced resin. Among others, a polypropylene resin which is inexpensive, has small specific gravity, is relatively high in heat resistance and is excellent also in characteristics such as moldability and chemical resistance has attracted attention.

However, a polyolefin-based resin is inferior in interfacial adhesion with a reinforcing fiber because of its low polarity. Therefore, attempts are being made to improve interfacial adhesion between a fiber and a matrix resin by the surface treatment of a reinforcing fiber and addition of a sizing agent. For example, Patent Document 1 describes a fiber treating agent using a propylene-based resin modified with an unsaturated dicarboxylic acid or a salt thereof. Patent Document 2 describes using an acid-modified polypropylene resin having specific acid value as a sizing agent suitable for a polypropylene resin. In Patent Document 3, a carbon fiber containing an ionomer resin is described. Patent Document 4 discloses a carbon fiber containing two kinds of acid-modified propylene-based resins. These attempts aim to improve interfacial adhesion between a carbon fiber and a matrix resin by using a resin having affinity for both the carbon fiber and the polyolefin resin.

By the way, there are few cases where the resin composition containing a carbon fiber as described above is used for a tape winding molding method. Since the tape winding molding method can also be applied to a molded article having a relatively complicated shape, it is useful for forming an external reinforcing layer of, for example, a pipe or a pressure vessel (see, e.g., Patent Document 5). In particular, as a tape winding molding method with a high degree of freedom in shape, there is a molding method using a laser welding method.

RELATED ART DOCUMENTS

Patent Documents

Patent Document 1: JP H6-107442 A
Patent Document 2: JP 2005-48343 A
Patent Document 3: JP 2006-124852 A
Patent Document 4: WO2006/101269
Patent Document 5: JP H9-257193 A

SUMMARY OF INVENTION

Technical Problem

The above-described Patent Documents 1 to 4 disclose that certain effects are exhibited in improving the mechanical property. On the other hand, it has been found according to the study of the present inventors that the conventional reinforcing fiber bundle may undergo shape change and some problematic handling properties may occur such as formation of partial fuzzy shape, resulting in generation of a fine powder. Particularly, this tendency is likely to occur when the amount of a fiber treating agent used is small. This phenomenon is thought to be due to the fact that the fiber bundle is easy to loose and easily untied when the reinforcing fiber bundle breaks or cracks in part.

Further, the present inventors examined tape winding molding using a laser welding method, and as a result, it turned out that the adhesive strength and surface characteristics of the fusion surface of the tape were not sufficient in some cases. That is, there was a tendency that peeling of the fused surface tends to occur, and the surface smoothness was sometimes deteriorated. The present inventors presumed that such a phenomenon may be caused by the following causes. That is, heat generation in the vicinity of a reinforcing fiber such as a carbon fiber which is easy to absorb energy of laser to generate heat is too high and thus a polyolefin as a matrix resin deteriorates locally, which triggers surface roughness in some cases. In addition, due to abnormal heat generation, the resin is squeezed out from the fiber, and the surface condition may be extremely deteriorated in some cases. The resin in the vicinity of the carbon fiber melts and shrinks to generate a cavity; and peeling around the carbon fiber tends to occur. That is, it is considered that this is a phenomenon caused by the remarkable deterioration of the homogeneity as the composition containing the resin and the fiber.

It is common to use a fiber treating agent for a reinforcing fiber. When the use amount of this treating agent is smaller, there is a merit that a manufacturing process can be simplified. On the other hand, depending on the amount of a fiber treating agent used, the spreading function may not be fully developed in some cases. Furthermore, if the amount of the fiber treating agent used is small, the physical properties of the reinforcing fiber-containing composition finally obtained may possibly be insufficient.

The present invention has been made to solve the above-described problems. That is, an object of the present invention is to provide a reinforcing fiber bundle excellent in handling properties while maintaining the mechanical property of a thermoplastic resin composition containing a reinforcing fiber bundle, and a molding material containing this reinforcing fiber bundle and a matrix resin.

Solution to Problem

As a result of extensive studies to achieve the above object, the present inventors have found that a reinforcing fiber bundle containing a polyolefin resin having a specific range of molecular weight at a specific content rate can maintain or improve the mechanical strength of the obtained thermoplastic resin composition, and it becomes a reinforcing fiber bundle with a stable shape. It has been also found that molded articles excellent in appearance and peeling strength can be obtained by using the reinforcing fiber bundle similar to the above also in winding molding, completing the present invention. That is, the present invention has the following constitutions.

[1] A reinforcing fiber bundle which contains a propylene-based resin (A), a propylene-based resin (B) comprising at least a carboxylic acid salt bonded to the polymer chain, and a reinforcing fiber (C) wherein the propylene-based resin (A) comprises more than 70% by mass but not more than 100% by mass of a component (A-1) having a weight average molecular weight of 150,000 or more, and 0 to 30% by mass of a component (A-2) having a weight average molecular weight of less than 150,000, provided that the sum of the component (A-1) and the component (A-2) is 100% by mass, the weight average molecular weight of the propylene-based resin (A) is higher than the weight average molecular weight of the propylene-based resin (B), the amount of the propylene-based resin (B) is 3 to 50 parts by mass per 100 parts by mass of the propylene-based resin (A), and the total content rate of the propylene-based resin (A) and the propylene-based resin (B) is 0.3 to 5% by mass in the whole reinforcing fiber bundle.

[2] The reinforcing fiber bundle according to [1], wherein the total content rate of the propylene-based resin (A) and the propylene-based resin (B) is 0.3 to 3% by mass in the whole reinforcing fiber bundle.

[3] The reinforcing fiber bundle according to [1], wherein the propylene-based resin (A) has a Shore A hardness of 60 to 90 or a Shore D hardness of 45 to 65.

[4] The reinforcing fiber bundle according to [1], wherein the propylene-based resin (A-1) comprises 0.0003 to 5% by mass of a group 15 to 17 element of the periodic table.

[5] The reinforcing fiber bundle according to [4], wherein the propylene-based resin (A-1) comprises a maleic anhydride structure.

[6] The reinforcing fiber bundle according to [1], which is a reinforcing fiber bundle for polyamide resin.

[7] A molding material which contains
1 to 80 parts by mass of the reinforcing fiber bundle of [1] and,
20 to 99 parts by mass of a thermoplastic matrix resin (M)
provided that the sum of the reinforcing fiber bundle and the matrix resin (M) is 100 parts by mass.

[8] The molding material according to [7], which contains
10 to 70 parts by mass of the reinforcing fiber bundle of [1] and,
30 to 90 parts by mass of a propylene-based resin (D)
provided that the sum of the reinforcing fiber bundle and the propylene-based resin (D) is 100 parts by mass,
wherein the weight average molecular weight Mw (A) of the propylene-based resin (A), the weight average molecular weight Mw (B) of the propylene-based resin (B) and the weight average molecular weight Mw (D) of the propylene-based resin (D) satisfy the following relation:

Mw($A$)>Mw($D$)>Mw($B$).

[9] The molding material according to [7], which contains
1 to 80 parts by mass of the reinforcing fiber bundle of [1] and,
20 to 99 parts by mass of a polyamide resin (E)
provided that the sum of the reinforcing fiber bundle and the polyamide resin (E) is 100 parts by mass.

[10] A fiber-reinforced resin composition for tape winding molding which contains the reinforcing fiber bundle of [1] and contains 20 to 80 parts by mass of a polymer (I) comprising an olefin-derived unit having 2 to 20 carbon atoms and having a carboxylic acid group wherein the melting point and/or the glass transition temperature is 50 to 300° C. and,
20 to 80 parts by mass of the reinforcing fiber (C)
provided that the sum of the polymer (I) and the reinforcing fiber (C) is 100 parts by mass.

[11] A fiber-reinforced resin composition for tape winding molding which contains
25 to 75 parts by mass of the reinforcing fiber bundle of [1] and,
25 to 75 parts by mass of at least one resin selected from the group consisting of the propylene-based resin (D) and the polyamide resin (E)
provided that the sum of the reinforcing fiber bundle and the resin is 100 parts by mass.

[12] The fiber-reinforced resin composition for tape winding molding according to [11], wherein the resin is the propylene-based resin (D).

[13] The fiber-reinforced resin composition for tape winding molding according to [10], which further contains 5 parts by mass or less of a dye (II) absorbing a light having a wavelength of 300 to 3000 μm, provided that the sum of the component (I) and the component (C) is 100 parts by mass.

[14] A laminated body having a layer containing the molding material of [7].

[15] A tape winding molded article containing the laminated body of [14].

[16] A tape winding molding method using a tape containing the fiber-reinforced resin composition of [10].

[17] The tape winding molding method according to [16], wherein the fiber-reinforced resin composition further contains 5 parts by mass or less of a dye (II) absorbing a light having a wavelength of 300 to 3000 μm, provided that the sum of the component (I) and the component (C) is 100 parts by mass.

Advantageous Effects of Invention

The reinforcing fiber bundle of the present invention is a reinforcing fiber bundle not only excellent in adhesion to a matrix resin (M) which is a thermoplastic resin, particularly adhesion to a polyolefin-based matrix resin, but also having a stable shape. Since the reinforcing fiber bundle of the present invention is expected to be excellent in shape stability such as being difficult to refine, such an effect is supposed to be obtained that in producing a thermoplastic resin composition containing the reinforcing fiber bundle or a molded article thereof, the problems such as clogging of a line, feed defect and dust disaster hardly occur, and that it is easy to produce stably a molded article excellent also in mechanical strength and dimensional stability. Therefore, the contribution to the industrial development of the present invention is great.

Modes for Carrying Out the Invention

The reinforcing fiber bundle of the present invention contains a propylene-based resin (A), a propylene-based resin (B) comprising at least a carboxylic acid salt bonded to the polymer chain, and a reinforcing fiber (C). The propylene-based resin (A) comprises more than 70% by mass but not more than 100% by mass of a component (A-1) having a weight average molecular weight of 150,000 or more and 0 to 30% by mass of a component (A-2) having a weight average molecular weight of less than 150,000, provided that the sum of the component (A-1) and the component (A-2) is 100% by mass). The weight average molecular weight of the propylene-based resin (A) is higher than the weight average molecular weight of the propylene-based resin (B). The amount of the propylene-based resin (B) is 3 to 50 parts by mass per 100 parts by mass of the propylene-based resin (A). The total content rate of the propylene-based resin (A) and the propylene-based resin (B) is 0.3 to 5% by mass in the whole reinforcing fiber bundle.

The kind of the reinforcing fiber constituting the reinforcing fiber bundle is not particularly limited, and a fiber with high strength and high elastic modulus is preferred. Specific examples of the reinforcing fiber include fibers such as a carbon fiber, a glass fiber, an aramid fiber, an alumina fiber, a silicon carbide fiber, a boron fiber and a metal fiber. Two or more of them may be used in combination. Among them, a carbon fiber is preferable, and PAN type, pitch type or rayon type carbon fibers are more preferable from the standpoint of improvement of mechanical properties and weight reduction effect of a molded article. Further, from the standpoint of the balance between strength and elastic modulus of the resultant molded article, PAN type carbon fibers are particularly preferable. Reinforcing fibers endowed with conductivity, for example, reinforcing fibers containing a metal such as nickel, copper and ytterbium can also be used. The metal is preferably contained in a form covering the reinforcing fiber.

The surface oxygen concentration ratio [O/C], which is the ratio of the number of oxygen (O) atoms to the number of carbon (C) atoms on the surface of the carbon fiber measured by X-ray photoelectron spectroscopy, is preferably 0.05 to 0.5, more preferably 0.08 to 0.4, particularly preferably 0.1 to 0.3. If the surface oxygen concentration ratio is 0.05 or more, the amount of functional groups on the carbon fiber surface can be sufficiently secured, and a stronger bond with the thermoplastic resin can be obtained. The upper limit of the surface oxygen concentration ratio is not particularly limited, and from the standpoint of the balance between the handling property and productivity of a carbon fiber, 0.5 or less is generally preferred.

The surface oxygen concentration ratio [O/C] of a carbon fiber can be measured by X-ray photoelectron spectroscopy according to the following procedure. First, a component such as a sizing agent attached to the carbon fiber surface is removed with a solvent and the carbon fiber bundle is cut into 20 mm. The cut fractions are spread and aligned on a copper sample holder, AlKα1 or 2 is used as the X-ray source and the pressure in the sample chamber is kept at $1 \times 10^8$ Torr. The kinetic energy value (K.E.) of the main peak of $C_{1s}$ is adjusted to 1202 eV as the correction value of the peak associated with the charging at the time of measurement. Then, the $C_{1s}$ peak area is obtained by drawing the straight base line in the range of 1191 to 1205 eV as K.E. Further, the $O_{1s}$ peak area is obtained by drawing the straight base line in the range of 947 to 959 eV as K.E. The surface oxygen concentration ratio [O/C] as the atomic number ratio is calculated using the ratio of the $O_{1s}$ peak area to the $C_{1s}$ peak area and the sensitivity correction value specific to the apparatus. Specifically, as the X-ray photoelectron spectroscopic apparatus, Model ES-200 manufactured by Kokusai electric Inc. is used, and the sensitivity correction value is set to 1.74.

The method of controlling the surface oxygen concentration ratio [O/C] of a carbon fiber to 0.05 to 0.5 is not particularly limited. For example, it can be controlled by methods such as an electrolytic oxidation treatment, a chemical solution oxidation treatment and a gas phase oxidation treatment. Among them, the electrolytic oxidation treatment is preferable.

The average fiber diameter of the reinforcing fiber (C) is not particularly limited, and is preferably 1 to 20 μm, more preferably 3 to 15 μm from the standpoint of mechanical properties and surface appearance of the resultant molded article. Although the number of single yarns of the reinforcing fiber bundle is not particularly limited, it is usually 100 to 350,000, preferably 1,000 to 250,000, more preferably 5,000 to 220,000. Further, since the propylene-based resin (A) and the propylene-based resin (B) described below are used in the present invention, it is also expected that the fiber bundle having a fiber number of 40,000 or more (large tow) will exhibit an excellent effect.

The propylene-based resin (A) contains more than 70% by mass but not more than 100% by mass of a component (A-1) having a weight average molecular weight of 150,000 or more, and 0 to 30% by mass of a component (A-2) having a weight average molecular weight of less than 150,000, provided that the sum of the component (A-1) and the component (A-2) is 100% by mass.

The weight average molecular weight of the component (A-1) in the propylene-based resin (A) [hereinafter also referred to as "propylene-based resin component (A-1)"] is 150,000 or more, preferably over 150,000, more preferably 200,000 or more, particularly preferably 250,000 or more, most preferably 280,000 or more. The upper limit value of the weight average molecular weight of the propylene-based resin component (A-1) is not particularly limited, and is preferably 700,000 or less, more preferably 500,000 or less, particularly preferably 450,000 or less and most preferably 400,000 or less, from the standpoint of melt flowability at molding and the appearance of a molded article.

When the sum of the component (A-1) and the component (A-2) described later is 100% by mass, the amount of the propylene-based resin component (A-1) is more than 70% by mass but not more than 100% by mass, preferably 73 to 100% by mass.

The weight average molecular weight of the component (A-2) contained in the propylene-based resin (A) as necessary [hereinafter also referred to as "propylene-based resin component (A-2)"] is less than 150,000, preferably 120,000 or less, more preferably 100,000 or less. The lower limit value of the weight average molecular weight of the propylene-based resin component (A-2) is not particularly limited, and is preferably 20,000 or more, more preferably 30,000 or more, particularly preferably 40,000 or more and most preferably 50,000 or more from the standpoint of the strength and handling properties (stickiness, etc.) of a reinforcing fiber bundle.

When the sum of the component (A-1) and the component (A-2) is 100% by mass, the amount of the propylene-based resin component (A-2) is 0 to 30% by mass. When the propylene-based resin component (A-2) is contained, the amount is preferably 3 to 30% by mass.

The difference between the weight average molecular weight of the propylene-based resin component (A-1) and the weight average molecular weight of the propylene-based resin component (A-2) is preferably 100,000 to 300,000, more preferably from 100,000 to 200,000, particularly preferably from 130,000 to 200,000.

Since the propylene-based resin (A) contains a specific amount of the propylene-based resin component (A-1) having the specific weight average molecular weight described above, even if the amount of the propylene-based resin (A) used for the reinforcing fiber bundle is comparatively small, the problem of fuzz, problems of shape change such as collapse, peeling and folding due to factors such as impact and a problem of generation of a fine powder due to them tend not to occur. In the present invention, it is presumed that since a comparatively large amount of the propylene-based resin component (A-1) having a relatively high molecular weight is contained, these problems are suppressed by the entanglement effect of the molecular chains. In the examinations of the present invention, it was found that, in particular, fibers having a large number of filaments tend to suffer from fuzz. An improvement according to the present invention is expected also for such fibers having a large number of filaments.

The propylene-based resin (A) is a resin having a structural unit derived from propylene in which the amount of the structural unit derived from propylene is preferably 50 mol % or more. In particular, a copolymer containing at least one structural unit derived from an olefin (excluding propylene) or a polyene selected from the group consisting of α-olefins, conjugated dienes and non-conjugated dienes, together with a propylene-derived structural unit, is preferable.

Specific examples of the α-olefin include α-olefins having 2 to 20 carbon atoms excluding propylene such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, 1-dodecene, 1-tetradecene, 1-hexadecene, 1-octadecene and 1-eicosene. Of these, 1-butene, ethylene, 4-methyl-1-pentene and 1-hexene are preferable, 1-butene and 4-methyl-1-pentene are more preferable.

Specific examples of the conjugated diene and the non-conjugated diene include butadiene, ethylidene norbornene, dicyclopentadiene and 1,5-hexadiene.

The α-olefins, the conjugated dienes and the non-conjugated dienes described above may be used in combination of two or more.

The propylene-based resin (A) is preferably a random or block copolymer of propylene and the above-described olefin or polyene compound. Within a range that does not impair the object of the present invention, another thermoplastic polymer may also be used in combination with the propylene-based resin with (A). As the other thermoplastic polymers, for example, an ethylene-propylene copolymer, and ethylene-1-butene copolymer and an ethylene-propylene-1-butene copolymer are preferable.

The proportion of the propylene-derived structural unit of the propylene-based resin (A) is preferably 50 to 100 mol %, more preferably 50 to 99 mol %, particularly preferably 55 to 98 mol % and most preferably 60 to 97 mol % from the standpoint of enhancing affinity with the matrix resin (M) and the propylene-based resin (B) described later.

The $^{13}$C NMR method is generally used for identifying monomer repeating units in the propylene-based resin (A). Mass spectrometry and elemental analysis may also be used. Also, a method can be used in which IR analysis is performed on a plurality of types of copolymers of different compositions whose composition has been determined by NMR method, and a calibration curve is prepared from information such as specific wave number absorption and the thickness of a specimen, to determine the composition. The IR method is preferably used for process analysis.

The propylene-based resin (A) preferably has a Shore A hardness of 60 to 90 or a Shore D hardness of 45 to 65. A more preferable range of the Shore A hardness is 65 to 88, and a particularly preferable range is 70 to 85. A more preferable range of Shore D hardness is 48 to 63. A particularly preferable range is 50 to 60. When the Shore A hardness or Shore D hardness of the propylene-based resin (A) is in these ranges, conformability to the reinforcing fiber is good, partial crack hardly occurs, and a reinforcing fiber bundle with stable shape is easily formed. Further, it tends to be advantageous in terms of enhancing the strength of a composition combined with the matrix resin (M) described later. This is presumably because the propylene-based resin (A) and the matrix resin (M) have a good entanglement structure of molecular chains.

In some cases, the propylene-based resin (A) preferably contains elements of groups 15 to 17 of the periodic table. A preferable constitution containing elements of groups 15 to 17 of the periodic table is a structure having a so-called functional group such as a carboxylic anhydride group, a carboxylic acid group, an amino group, an acid amide group and a halogen group. Such a structure can be introduced by a known method such as a radical grafting reaction. As an example of the group 17 element, halogens, more specifically chlorine can be mentioned. As the group 16 element, oxygen and sulfur are representative examples, and oxygen is preferable. A typical example of the group 15 element is nitrogen. Among them, oxygen is particularly preferable. The structure of a preferred functional group is a carboxylic acid group or a carboxylic anhydride group. In particular, it is preferably a group having a maleic anhydride structure. In particular, it is preferable that the propylene resin (A-1) has the above-mentioned constitution.

These elements and functional groups may be used alone or in combination of two or more.

When the propylene-based resin (A) contains a 15 to 17 group element in the periodic table, the content rate of the element is preferably in the range of 0.0003 to 5% by mass, provided that the whole propylene-based resin (A) is 100% by mass. In addition, the content rate of the elements in the propylene-based resin (A-1) is preferably between 0.0003 and 5% by mass, provided that the whole propylene-based resin (A-1) is 100% by mass. Any of these upper limits is more preferably 4.5% by mass, particularly preferably 4.3% by mass, most preferably 4% by mass. Any of these lower limits is more preferably 0.0005% by mass, particularly preferably 0.0008% by mass, most preferably 0.001% by mass. If the upper limit is exceeded, fuzz may occur conversely and it may be difficult to obtain a propylene-based resin having a sufficiently high molecular weight. On the other hand, when emphasizing the peeling strength in the case of lamination by the tape winding method described later, it is preferable that the above-mentioned lower limit is exceeded. These content rates can be calculated, for example, from the structure and charge ratio of each component in the graft reaction described above. It can also be specified by an elemental analysis apparatus such as varioEL III type: manufactured by ELEMENTAL.

The inclusion of the above elements tends to be advantageous in enhancing the interaction with the propylene-based resin (B) and the reinforcing fiber (C) described later.

The propylene-based resin (A) may be modified with a compound containing, for example, a carboxylic acid group or a carboxylic acid ester group, or may be an unmodified form. Preferably, it is a propylene-based resin modified with a compound containing, for example, a carboxylic acid group or a carboxylic acid ester group. When the propylene-based resin (A) is a modified product, the amount of modification thereof is preferably less than 2.0 mmol equivalent, more preferably 1.0 mmol equivalent or less, particularly preferably 0.5 mmol equivalent or less, in terms of the group represented by —C(=O)—O—. A preferable lower limit value is 0.005 mmol equivalent, more preferably 0.008 mmol equivalent.

On the other hand, depending on the application to be used, the propylene-based resin (A) may be preferably substantially unmodified in some cases. Here, substantially unmodified means that it is desirably not modified at all, but even if it is modified, its modification amount is within a range that does not impair the above-mentioned object, and its modification amount is desirably less than 0.05 mmol equivalent, preferably 0.01 mmol equivalent or less, more preferably 0.005 mmol equivalent or less, particularly preferably 0.001 mmol equivalent or less, most preferably 0.0001 mmol equivalent or less, in terms of the group represented by —C(=O)—O—.

The propylene-based resin (B) is a propylene-based resin containing at least some carboxylic acid salt attached to the polymer chain. This carboxylic acid salt is effective in enhancing interaction with the reinforcing fiber (C).

Examples of the propylene-based polymer as the raw material of the propylene-based resin (B) include propylene homopolymers; and copolymers of propylene with single α-olefin or two or more α-olefins, typified by an ethylene-propylene copolymer, a propylene-1-butene copolymer and an ethylene-propylene-1-butene copolymer. Examples of the monomer having a carboxylic acid structure, among the raw materials, include monomers having a neutralized or non-neutralized carboxylic acid group and monomers having a saponified or unsaponified carboxylic acid ester. Radical graft polymerization of such a propylene-based polymer and a monomer having a carboxylic acid structure is a typical method for producing the propylene-based resin (B). Specific examples of olefins used in the propylene-based polymer are the same as the olefins used in the propylene-based resin (A).

By use of a special catalyst, it is possible to obtain a propylene-based resin (B) by directly polymerizing propylene and a monomer having a carboxylate ester, and if it is a polymer containing a large amount of ethylene, it is possible to obtain a propylene-based resin (B) by high-pressure radical polymerization of ethylene and propylene and a monomer having a carboxylic acid structure.

Examples of the monomers having a neutralized or non-neutralized carboxylic acid group and the monomers having a saponified or unsaponified carboxylic acid ester include ethylenically unsaturated carboxylic acids, their anhydrides, their esters; compounds having unsaturated vinyl groups other than olefins.

Specific examples of the ethylenically unsaturated carboxylic acid include (meth)acrylic acid, maleic acid, fumaric acid, tetrahydrophthalic acid, itaconic acid, citraconic acid, crotonic acid and isocrotonic acid. Specific examples of the acid anhydride include Nadic Acid™ (endocis-bicyclo[2.2.1]hept-5-ene-2,3-dicarboxylic acid), maleic anhydride and citraconic anhydride.

Specific examples of the compound having an unsaturated vinyl group other than olefins include (meth)acrylic acid esters such as methyl (meth)acrylate, ethyl (meth)acrylate, propyl (meth)acrylate, n-butyl (meth)acrylate, i-butyl (meth)acrylate, tert-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, stearyl (meth)acrylate, tridecyl (meth)acrylate, lauroyl (meth)acrylate, cyclohexyl (meth)acrylate, benzyl (meth)acrylate, phenyl (meth)acrylate, isobornyl (meth)acrylate, dicyclopentanyl (meth)acrylate, dicyclopentenyl (meth)acrylate, dimethylaminoethyl (meth)acrylate and diethylaminoethyl (meth)acrylate; hydroxyl group-containing vinyls such as hydroxyethyl acrylate, 2-hydroxyethyl (meth)acrylate, 2-hydroxypropyl (meth)acrylate, 4-hydroxybutyl acrylate, lactone-modified hydroxyethyl (meth)acrylate and 2-hydroxy-3-phenoxypropyl acrylate; epoxy group-containing vinyls such as glycidyl (meth)acrylate and methyl glycidyl (meth)acrylate; isocyanate group-containing vinyls such as vinyl isocyanate and isopropenyl isocyanate; aromatic vinyls such as styrene, α-methyl styrene, vinyl toluene and t-butyl styrene; amides such as acrylamide, methacrylamide, N-methylolmethacrylamide, N-methylol acrylamide, diacetone acrylamide and maleic acid amide; vinyl esters such as vinyl acetate and vinyl propionate; aminoalkyl (meth)acrylates such as N,N-dimethylaminoethyl (meth)acrylate, N,N-diethylaminoethyl (meth)acrylate, N,N-dimethylaminopropyl (meth)acrylate, N,N-dipropylaminoethyl (meth)acrylate, N,N-dibutylaminoethyl (meth)acrylate and N,N-dihydroxyethylaminoethyl (meth)acrylate; unsaturated sulfonic acids such as styrene sulfonic acid, sodium styrenesulfonate and 2-acrylamido-2-methylpropanesulfonic acid; unsaturated phosphoric acids such as mono (2-methacryloyloxyethyl) acid phosphate and mono (2-acryloyloxyethyl) acid phosphate.

Two or more of these monomers may be used in combination. Among them, acid anhydrides are preferable, and maleic anhydride is more preferable.

The propylene-based resin (B) can be obtained by various methods as described above. More specifically, there are, for example, a method in which a propylene-based polymer and an ethylenically unsaturated carboxylic acid having an unsaturated vinyl group or a monomer having an unsaturated vinyl group other than olefins are reacted in an organic solvent in the presence of a polymerization initiator, then, the solvent is removed; a method in which a melt obtained by heat-melting a propylene-based polymer, a carboxylic acid having an unsaturated vinyl group and a polymerization initiator are reacted under agitation; and, a method in which a mixture of a propylene-based polymer, a carboxylic acid having an unsaturated vinyl group and a polymerization initiator is fed to an extruder and they are reacted while heat-kneading, then, a carboxylic acid salt is obtained by a method such as neutralization and saponification.

Specific examples of the polymerization initiator include various peroxide compounds such as benzoyl peroxide, dichlorobenzoyl peroxide, dicumyl peroxide, di-tert-butyl peroxide and 2,5-dimethyl-2,5-di(peroxybenzoate) hexyne-3, 1,4-bis (tert-butylperoxyisopropyl) benzene. Azo compounds such as azobisisobutyronitrile may also be used. Two or more polymerization initiators may be used in combination.

Specific examples of the organic solvent include aromatic hydrocarbons such as xylene, toluene and ethylbenzene; aliphatic hydrocarbons such as hexane, heptane, octane, decane, isooctane and isodecane; alicyclic hydrocarbons such as cyclohexane, cyclohexene, methylcyclohexane and ethylcyclohexane; ester solvents such as ethyl acetate, n-butyl acetate, cellosolve acetate, propylene glycol monomethyl ether acetate, propylene glycol monoethyl ether acetate and 3-methoxybutyl acetate; and ketone solvents such as methyl ethyl ketone and methyl isobutyl ketone. Mixtures of two or more organic solvents may be used. Among these, aromatic hydrocarbons, aliphatic hydrocarbons and alicyclic hydrocarbons are preferable, and aliphatic hydrocarbons and alicyclic hydrocarbons are more preferable.

It is preferable that the content rate of 15-17 group elements of the periodic table in the propylene-based resin (B) is higher than that of any of the propylene-based resin (A), the propylene-based resin (A-1) and the propylene-based resin (A-2) described above. More specifically, when the content rate of elements of groups 15 to 17 of the periodic table of in the propylene-based resin (B) is higher by preferably 0.3% by mass or more, more preferably 0.5% by mass or more, particularly preferably 0.7% by mass or more than that of any of the propylene-based resin (A), the propylene-based resin (A-1) and the propylene-based resin (A-2) described above, it tends to be able to obtain a stable emulsion and it is advantageous for obtaining strong interaction with the reinforcing fiber (C).

It is well known that the content rate of a carboxylic acid group of the propylene-based resin (B) can be determined by NMR or IR measurement described later. It is also possible to specify the content rate of a carboxylic acid group by the acid value. The acid value of the propylene-based resin (B) is preferably 10 to 100 mg KOH/g, more preferably 20 to 80 mg KOH/g, particularly preferably 25 to 70 mg KOH/g, most preferably 25 to 65 mg KOH/g.

The method of obtaining the propylene-based resin (B) through the neutralization or saponification step is a practical and preferable method since it is easy to treat the raw material of the propylene-based resin (B) in the form of an aqueous dispersion.

Specific examples of basic substances used for neutralization or saponification of the aqueous dispersion include alkali metals or alkaline earth metals or other metals such as sodium, potassium, lithium, calcium, magnesium and zinc, inorganic amines such as hydroxylamine and ammonium hydroxide; organic amines such as ammonia, (tri)methylamine, (tri)ethanolamine, (tri)ethylamine, dimethylethanolamine and morpholin; oxides, hydroxides or hydrides of alkali metals or alkaline earth metals or other metal such as sodium oxide and sodium peroxide; and weak acid salts of alkali metals or alkaline earth metals or other metals such as sodium carbonate. As the carboxylic acid salt or carboxylic acid ester neutralized or saponified with a basic substance, particularly, alkali metal carboxylates such as sodium carboxylate and potassium carboxylate; and ammonium carboxylate are preferable.

The degree of neutralization or the degree of saponification, that is, the degree of conversion of a carboxylic acid group possessed by the raw material of the propylene-based resin (B) to a carboxylic acid salt such as a metal salt or an ammonium salt is usually 50 to 100%, preferably 70 to 100% and more preferably 85 to 100% from the standpoint of stability of an aqueous dispersion and adhesiveness to a fiber. The carboxylic acid group in the propylene-based resins (B) is preferably totally neutralized or saponified with a basic substance, and a part of the carboxylic acid group may be present without neutralization or saponification.

As a method for analyzing a salt component of a carboxylic acid group, there are, for example, a method of detecting a metal species forming the salt by ICP emission spectrometry and a method of identifying the structure of a salt of an acid group using IR, NMR, mass spectrometry or elemental analysis.

As a method of calculating the conversion rate of a carboxylic acid group to a neutralized salt, there is, for example, a method in which the propylene-based resin (B) is dissolved in heated toluene and titrated with a 0.1 N potassium hydroxide-ethanol standard solution, the acid value of the propylene-based resin (B) is determined by the following formula, and the conversion rate is calculated by comparing with the total number of moles of the original carboxylic acid group.

$$\text{Acid value} = (5.611 \times A \times F)/B \text{ (mg KOH/g)}$$

A: Use amount (ml) of 0.1 N potassium hydroxide-ethanol standard solution
F: Factor of 0.1 N potassium hydroxide-ethanol standard solution
B: Sampling amount (g)

Next, the acid value calculated by the above method is converted into the number of moles of the carboxylic acid group not neutralized according to the following formula.

$$\text{Number of moles of carboxylic acid group not neutralized} = \text{acid value} \times 1000/56 \text{ (mol/g)}$$

Then, the conversion rate of a carboxylic acid group to a neutralized salt is calculated according to the following formula using the total number of moles (mol/g) of the carboxylic acid group calculated by separately quantifying carbonyl carbon of the carboxylic acid group by a method such as IR, NMR and elemental analysis.

$$\text{Conversion rate \%} = (1-r) \times 100(\%)$$

r: Number of moles of carboxylic acid group not neutralized/total number of moles of carboxylic acid group In view of enhancing the interaction with the reinforcing fiber (C), the content of a carboxylic acid salt bonded to the polymer chain of the propylene-based resin (B) is preferably 0.05 to 5 mmol equivalent in total in terms of the group represented by —C(=O)—O— per g of the propylene-based resin (B). It is more preferably 0.1 to 4 mmol equivalent, particularly preferably 0.3 to 3 mmol equivalent. As a method of analyzing the content of a carboxylic acid salt as described above, a method of quantitatively performing detection of a metal species that forms a salt by ICP emission spectrometry, and a method of performing quantification of carbonyl carbon of a carboxylic acid salt using, for example, IR, NMR or elemental analysis are mentioned. As a more specific method of measuring the content rate of a carboxylic acid skeleton, the following methods are exemplified. The content rate of a carboxylic acid skeleton of the sample can be specified by an ordinary method by using the $^{13}$C NMR method under 100 MHz or more and under high temperature solution condition of 120° C. or higher. There is also known a method in which after determining the content rate of a carboxylic acid skeleton by measuring a plurality of samples with different carbonyl skeleton content rates by the above-described $^{13}$C NMR, IR measurement of the same sample is carried out, and a calibration curve of the ratio of characteristic absorption of, for example, carbonyl, and the sample thickness or other characteristic absorption and the content rate of a carboxylic acid skeleton is fabricated, and the introduction rate of a carboxylic acid skeleton is specified by IR measurement.

In the present invention, the weight average molecular weight of the propylene-based resin (A) is higher than the weight average molecular weight of the propylene-based resin (B) in one important constitution. As a result, it is expected that the propylene-based resin (B) is easy to move during molding, and the interaction between the reinforcing fiber (C) and the propylene-based resin (B) is strengthened. The difference between the weight average molecular weight of the propylene-based resin (A) and the weight average molecular weight of the propylene-based resin (B) is preferably from 10,000 to 380,000, more preferably from 120,000 to 380,000, particularly preferably 130,000 to 380,000.

The weight average molecular weight of the propylene-based resin (B) is preferably 1,000 to 100,000, more preferably 2,000 to 80,000, particularly preferably 5,000 to 50,000 and most preferably 5,000 to 30,000 in view of the above-described interaction and compatibility with the propylene-based resin (A), preferably compatibility with the propylene-based resin (A-2).

In the present invention, the weight average molecular weight is determined by gel permeation chromatography (GPC).

The propylene-based resins (A) and (B) can be brought into contact with the reinforcing fiber (C) in various forms. For example, the propylene-based resin (A) and the propylene-based resin (B) may be melted as it is or with using a heat stabilizer in combination, and brought into contact with the reinforcing fiber (C), alternatively the propylene-based resins (A) and (B) may be brought into contact with the reinforcing fiber (C) in the form of an emulsion or suspension. A heat treatment may be performed after the contacting step. From the standpoint of efficient contact with the reinforcing fiber (C), it is preferable that the propylene-based resins (A) and (B) are brought into contact with the reinforcing fiber (C) in the form of an emulsion.

Per 100 parts by mass of the propylene-based resin (A), the amount of the propylene-based resin (B) is 3 to 50 parts by mass, preferably 3 to 45 parts by mass, more preferably 5 to 45 parts by mass, particularly preferably 7 to 40 parts by mass, most preferably 10 to 40 parts by mass. Within the ranges, it is possible to achieve properties regarding strength and form derived from the propylene-based resin (A) and affinity with the reinforcing fiber (C) simultaneously at high level. When the amount of the propylene-based resin (B) is less than 3 parts by mass, affinity with the reinforcing fiber (C) lowers and the adhesion property may possibly be inferior. When the amount of the propylene-based resin (B) is over 50 parts by mass, the strength of the mixture itself lowers and fuzz increases in some cases, and there is a possibility that strong adhesive property may not be maintained.

By controlling the molecular weights and the content rates of the propylene-based resins (A) and (B) in the above-explained ranges, it is expected that the propylene-based resins (A) and (B) effectively perform interaction with the reinforcing fiber (C) and the matrix resin (M) and compatibility increases relatively, to improve adhesion.

In addition to the propylene-based resins (A) and (B), other components may be used in combination in the reinforcing fiber bundle of the present invention as long as the effects of the present invention are not impaired. For example, when a propylene-based resin is applied in the form of an emulsion to a reinforcing fiber bundle, for example, a surfactant for stabilizing an emulsion may be added. The amount of such other components is preferably 10 parts by mass or less, more preferably 5 parts by mass or less, particularly preferably 2 parts by mass or less per 100 parts by mass of the sum of the propylene-based resin (A) and the propylene-based resin (B).

The content rate of the sum of the propylene-based resin (A) and the propylene-based resin (B) is 0.3 to 5% by mass in the whole reinforcing fiber bundle. In the present invention, the effect of the present invention can be obtained even if the content rate of the sum of the propylene-based resin (A) and the propylene-based resin (B) is relatively low. However, when the content rate is less than 0.3% by mass, there are many exposed portions of the reinforcing fiber in some cases, thereby the strength of the resultant product lowers, or the handling property of the reinforcing fiber bundle becomes insufficient in some cases. The handling property referred to herein is, for example, hardness of a fiber bundle or easiness of disassembly of a fiber bundle in winding the fiber bundle on a bobbin. It is, for example, convergence of chopped fiber bundles obtained by cutting a fiber bundle. On the other hand, when the content rate is over 5% by mass, the mechanical property of a molded article may lower extremely and the fiber bundle may become too hard to wind on a bobbin. The lower limit value of this content rate is preferably 0.4% by mass or more from the standpoint of the balance between adhesion and the handing property of a reinforcing fiber bundle. On the other hand, the upper limit value is preferably 4% by mass or less, more preferably 3% by mas or less.

The method of adhering the propylene-based resins (A) and (B) to the reinforcing fiber bundle is not particularly limited. From the standpoint of easy uniform adhesion between single fibers, it is preferable to apply an emulsion of a mixture of the propylene-based resin (A) and the propylene-based resin (B) to a reinforcing fiber bundle and dry it. As a method for imparting an emulsion to a reinforcing fiber bundle, known methods such as a roller impregnation method, a roller transfer method and a spray method can be used.

The molding material of the present invention containing the reinforcing fiber bundle and a matrix resin (referred to also as a reinforcing fiber bundle-containing resin composition) is not particularly limited. Specific examples of the matrix resin include a polycarbonate resin, a styrene-based resin, a polyamide resin, a polyester resin, a polyphenylene sulfide resin (PPS resin), a modified polyphenylene ether resin (modified PPE resin), a polyacetal resin (POM resin), a liquid crystal polyester, a polyarylate, acryl resins such as a polymethyl methacrylate resin (PMMA), vinyl chloride, polyimide (PI), polyamideimide (PAI), polyetherimide (PEI), polysulfone, polyether sulfone, polyketone, polyether ketone, polyether ether ketone (PEEK), polyolefins such as polyethylene and polypropylene, modified polyolefin, thermoplastic resins such as a phenol resin and a phenoxy resin, further, an ethylene/propylene copolymer, an ethylene/1-butene copolymer, an ethylene/propylene/diene copolymer, an ethylene/carbon monoxide/diene copolymer, an ethylene/ethyl (meth)acrylate copolymer, ethylene/glycidyl (meth) acrylate, an ethylene/vinyl acetate/glycidyl (meth)acrylate copolymer, and various elastomers such as a polyether ester elastomer, a polyether ether elastomer, a polyether ester amide elastomer, a polyester amide elastomer and a polyester ester elastomer. Two or more of these may be used in combination. In particular, the matrix resin (M) which is thermoplastic is preferred. As the matrix resin (M), known thermoplastic resins can be used without limitation, and as the resin having polarity, polyamide resins and polyester resins are preferable, and as the resin having low polarity, polyolefin-based resins are preferable. In particular, from the standpoint of cost and weight reduction of a molded article, propylene-based resins (D) and polyamide resins (E) described later are more preferable. That is, reinforcing fiber bundle-containing propylene-based resin compositions and reinforcing fiber bundle-containing polyamide resin compositions are preferably used for a molding material and a molded article.

The amount of the reinforcing fiber bundle in the molding material of the present invention (reinforcing fiber bundle-containing resin composition) is 1 to 80 parts by mass, preferably 1 to 70 parts by mass, more preferably 3 to 68 parts by mass, particularly preferably 5 to 65 parts by mass. The amount of the matrix resin (M) is 20 to 99 parts by mass, preferably 30 to 99 parts by mass, more preferably 32 to 97 parts by mass, particularly preferably 35 to 95 parts by mass. These are amounts when the sum of the reinforcing fiber bundle and the matrix resin (M) is taken as 100 parts by mass.

When using a propylene-based resin (D) as the matrix resin (M), the lower limit value of the amount of the reinforcing fiber bundle in the molding material of the present invention (reinforcing fiber bundle-containing propylene-based resin composition) is 1 part by mass or more, preferably 3 parts by mass or more, more preferably 5 parts by mass or more, particularly preferably 10 parts by mass or more, and the upper limit value is 80 parts by mass or less, preferably 70 parts by mass or less, more preferably 68 parts by mass or less, particularly preferably 65 parts by mass or less. The lower limit value of the amount of the propylene-based resin (D) is 20 parts by mass or more, preferably 30 parts by mass or more, more preferably 32 parts by mass or more, particularly preferably 35 parts by mass or more, and the upper limit value is 99 parts by mass or less, preferably 97 parts by mass or less, more preferably 95 parts by mass or less, particularly preferably 90 parts by mass or less. These are amounts when the sum of the reinforcing fiber bundle and the propylene-based resin (D) is taken as 100 parts by mass.

When using a polyamide resin (E) as the matrix resin (M), the lower limit value of the amount of the reinforcing fiber bundle in the molding material of the present invention (reinforcing fiber bundle-containing polyamide resin composition) is 1 part by mass or more, preferably 10 parts by mass or more, more preferably 20 parts by mass or more, and the upper limit value is 80 parts by mass or less, preferably 75 parts by mass or less, more preferably 70 parts by mass or less. The lower limit value of the amount of the polyamide resin (E) is 20 parts by mass or more, preferably 25 parts by mass or more, more preferably 30 parts by mass or more, and the upper limit value is 99 parts by mass or less, preferably 90 parts by mass or less, more preferably 80 parts by mass or less. These are amounts when the sum of reinforcing fiber bundle and the polyamide resin (E) is taken as 100 parts by mass.

The propylene-based resin (D) may be an unmodified propylene-based resin or a propylene-based resin containing a carboxylic acid structure or a carboxylic acid salt structure by a method such as modification. When both the unmodified resin and the propylene-based resin containing a carboxylic acid structure or a carboxylic acid salt structure are used, the preferable mass ratio thereof is 99/1 to 80/20 in terms of the unmodified/modified ratio, more preferably 98/2 to 85/15, further preferably 97/3 to 90/10. As the above-described propylene-based resin composition, general propylene resins containing a structural unit derived from monomers (for example, olefins, carboxylic acid ester compounds) described in explanation of the propylene-based resin (A) and the propylene-based resin (B) are preferable embodiments. Examples thereof are propylene polymers called homo polypropylene, random polypropylene, block polypropylene or modified polypropylene.

A preferable embodiment of the propylene-based resin (D) is a composition containing an unmodified propylene-based resin and an acid-modified propylene-based resin. In such an embodiment, it is easy to have interaction with both the propylene-based resin (A) and the propylene-based resin (B), so that it can be expected to manifest high adhesive force between the reinforcing fiber bundle and the matrix resin.

It is preferable that the weight average molecular weight Mw (D) of the propylene-based resin (D), the weight average molecular weight Mw (A) of the propylene-based resin (A) of the reinforcing fiber bundle and the weight average molecular weight Mw (B) of the propylene-based resin (B) of the reinforcing fiber bundle satisfy the following relation:

$$Mw(A) > Mw(D) > Mw(B)$$

The specific weight average molecular weight of the propylene-based resin (D) is preferably from 50,000 to 350,000, more preferably from 100,000 to 330,000, particularly preferably from 150,000 to 320,000. The difference in the molecular weight between the propylene-based resin (A) and the propylene-based resin (D) is preferably from 10,000 to 400,000, more preferably from 20,000 to 200,000, particularly preferably from 20,000 to 100,000.

It is preferable that the propylene-based resin (D) is adhered around a reinforcing fiver bundle containing the reinforcing fiber (C), the propylene-based resin (A) and the propylene-based resin (B). In the present invention, since the propylene-based resin (A) contains a large amount of a component having very high weight average molecular weight, a reinforcing fiber bundle is hard to fuzz as described above and is advantageous in strength, and the propylene-based resin (D) is relatively excellent in flowability, thus, it is expected to provide a molding material and a molded article excellent in surface shape. Accordingly, the molding material of the present invention is excellent in the balance between appearance and strength.

The propylene-based resin (D) can be produced by a known method. The stereoregularity of the resin (polymer) may be isotactic, syndiotactic or atactic. The stereoregularity is preferably isotactic or syndiotactic.

Specific methods for producing such resins (particularly unmodified resins) are described, for example, in WO2004/087775 pamphlet, WO2006/057361 pamphlet, WO2006/123759 pamphlet, JP 2007-308667 A, WO 2005/103141 pamphlet, JP 4675629, WO2014/050817 pamphlet and JP 2013-237861 A.

Emulsions can also be prepared by known methods. A specific production method thereof is described, for example, WO2007/125924 pamphlet, WO2008/096682 pamphlet and JP 2008-144146 A.

Meanwhile, a fiber-reinforced resin composition (molding material) using a polyolefin-based resin as the matrix resin (M) tends not to have adequate adhesion to metals. On the other hand, when a polyamide resin (E) is used as the matrix resin (M), adhesion to metals is improved as compared with a polyolefin-based resin. That is, in applications requiring adhesion to metals, the carbon fiber bundle of the present invention is also very useful as a carbon fiber bundle for polyamide resins. As the polyamide resin (E), any known polyamide resins can be used without limitation. Specific examples thereof include polyamide 6, polyamide 12, polyamide 66, polyamide 11, and aromatic polyamides. Among these, polyamide 6 and polyamide 12 are preferable.

As a method for specifying easiness of loosening of a fiber bundle caused by, for example, fuzz described above, for example, a method described in JP 5584977 and a method for evaluating convergence described in JP 2015-165055 A are known. Evaluation is performed by the former method in examples of the present specification. The latter is specifically a method as described below.

A reinforcing fiber bundle is cut into short fibers of about 5 mm using stainless steel scissors. The resultant short fiber is evaluated by the following visual judgment.

A: Short fibers keep almost the same state as before cutting.

X: Short fibers are loosened significantly or have cracks occurred.

In order to exhibit stronger adhesion, it is preferable that 60% or more of the surface of the single fiber forming the reinforcing fiber bundle of the present invention is coated by a mixture containing the propylene-based resin (A) and the propylene-based resin (B). A part not coated cannot exert adhesion, and serves as a starting point for peeling, which sometimes reduces the overall adhesion. More preferably, 70% or more is coated, and particularly preferably, 80% or more is coated. The coating state can be evaluated, for example, by a method of tracing a metal element of a carboxylic acid salt by a scanning electron microscope (SEM) or elemental analysis of the fiber surface.

The preferred shape of the reinforcing fiber bundle of the present invention includes chopped reinforcing fiber bundles obtained by cutting roving as a continuous fiber into prescribed length, and ground milled fibers. From the standpoint of the handling property, the chopped reinforcing fiber bundle is particularly preferred. Although the fiber length in the chopped reinforcing fiber bundle is not particularly limited, it is preferably from 1 to 30 mm, more preferably from 2 to 15 mm, from the standpoint of sufficiently exerting convergence and sufficiently maintaining the shape after cutting and from the standpoint of easy handling. If the convergence of the chopped reinforcing fiber bundle is insufficient, fuzz may occur due to friction in transporting the chopped reinforcing fiber bundle, resulting in the occurrence of fiber balls deteriorating the handling property. Particularly when it is used for compound application, supply ability of chopped yarn to the extruder becomes worse due to occurrence of fiber balls, possibly reducing productivity. As an indicator of convergence, bulk density of the chopped reinforcing fiber bundle can be mentioned. The bulk density is determined by filling a container with a certain weight of the chopped reinforcing fiber bundle, determining the occupied volume, and dividing the weight by the volume.

The molding method using the reinforcing fiber bundle of the present invention is not particularly limited, and there are, for example, (1) a molding method using compound pellets as a molding material obtained by once melt-kneading the reinforcing fiber bundle and a matrix resin (M), (2) a direct molding method in which a molding material obtained by mixing a reinforcing fiber bundle and matrix resin pellets is fed to a molding machine directly or the reinforcing fiber bundle and matrix resin pellets are separately fed to a molding machine directly, poured into a molding mold, and solidified by cooling and (3) a molding method using a molding material of long fiber pellets obtained by coating the reinforcing fiber bundle with a matrix resin.

As another molding method using the reinforcing fiber bundle of the present invention, there is, for example, a method in which opened fiber bundles are aligned and brought into contact with the molten matrix resin (M), whereby obtaining a unidirectional carbon fiber-reinforced thermoplastic resin molded article (unidirectional material). This unidirectional material can be used as it is, or it can be used by preparing a laminate by laminating a plurality of them and integrating them. Further, it can be appropriately cut into a tape shape.

The reinforcing fiber bundle of the present invention is also useful for a fiber-reinforced resin composition for tape winding molding (molding material for tape winding molding). The matrix resin (M) in this case is also not particularly limited, but one or more kinds of resins selected from the group consisting of the propylene-based resin (D) and the polyamide resin (E) are preferable. The amount of the reinforcing fiber bundle in this case is preferably from 25 to 75 parts by mass and the amount of the resin is preferably from 25 to 75 parts by mass. These are amounts when the sum of the reinforcing fiber bundle and the resin is taken as 100 parts by mass.

Meanwhile, the present inventors examined the tape winding molding using the laser welding method, as described above, and as a result, it was found that the adhesive strength and the surface characteristics of the fusion surface of the tape were not sufficient in some cases. That is, there is a tendency that peeling of the fused surface tends to occur, and the surface smoothness is sometimes deteriorated. The present inventors presumed that such a phenomenon may be caused by the following causes. That is, heat generation in the vicinity of a reinforcing fiber such as a carbon fiber which easily absorbs energy of laser to generate heat is too high, and a polyolefin which is a matrix resin locally deteriorates, which triggers surface roughness sometimes. In addition, due to abnormal heat generation, the resin is squeezed out from the fiber, and the surface condition may be extremely deteriorated in some cases. The resin in the vicinity of the carbon fiber melts and shrinks to generate a cavity, and peeling around the carbon fiber tends to occur. That is, it is considered that this is a phenomenon caused by remarkable deterioration of the homogeneity as the composition containing the resin and the fiber.

It is also preferable in the present invention that the fiber-reinforced resin composition for tape winding molding contains a polymer (I) containing the reinforcing fiber bundle of the present invention, containing an olefin-derived unit having 2 to 20 carbon atoms and having a carboxylic acid group having a melting point and/or glass transition temperature of 50 to 300° C., for example, as a part or the whole body of the matrix resin (M), from this point of view. Since the fiber-reinforced resin composition contains a relatively large amount of the polymer (I) as a modified resin, there is a tendency that the structure between the reinforcing fiber and the resin is hard to change even by using a laser fusion method. It is speculated that even if the modified resin near the reinforcing fiber (propylene-based resin (B), etc.) is destroyed, the polymer (I) holds this. As a result, heat generation and deterioration of the resin by laser are suppressed, and peeling strength and surface characteristics (surface roughness) of the tape winding molded article are also expected to be improved.

The amount of the reinforcing fiber (C) in the fiber-reinforced resin composition for tape winding molding is usually 20 to 80 parts by mass, preferably 30 to 75 parts by mass, more preferably 35 to 70 parts by mass, particularly preferably 40 to 65 parts by mass, most preferably to 40 to 60 parts by mass. The amount of the polymer (I) is usually 20 to 80 parts by mass, preferably 25 to 70 parts by mass, more preferably 30 to 65 parts by mass, particularly preferably 35 to 60 parts by mass, most preferably 40 to 60 parts by mass. These are amounts when the sum of the reinforcing fiber (C) and the polymer (I) is taken as 100 parts by mass. If the amount of the reinforcing fiber (C) is too large, tape peeling may easily occur in the tape winding molded article described later. On the other hand, if the amount of the polymer (I) is too large, the strength of the tape winding molded article may decrease.

When the polymer (I) having a carboxylic acid group is a modified propylene-based resin as a part of the matrix resin (M), the mass ratio of an unmodified propylene-based resin and a modified propylene-based resin in the matrix resin (M) is preferably from 80/21 to 93/7, more preferably from 82/18 to 92/8, particularly preferably from 83/17 to 92/8 and most preferably from 83/17 to 91/9, as the unmodified/modified ratio. As the propylene-based resin composition, general propylene resins containing a structural unit derived from monomers (for example, olefins and carboxylic acid ester compounds) described in explanation of the propylene-based resin (A) and the propylene-based resin (B) are preferable embodiments. Examples thereof are propylene polymers called homo polypropylene, random polypropylene, block polypropylene or modified polypropylene. Further, the amount of the reinforcing fiber bundle in the fiber-reinforced resin composition in this case is preferably 25 to 75 parts by mass, more preferably 30 to 68 parts by mass, particularly preferably 35 to 65 parts by mass. On the other hand, the amount of the propylene-based resin is preferably 25 to 75 parts by mass, more preferably 32 to 70 parts by mass, particularly preferably 35 to 65 parts by mass. These are amounts when the sum of the reinforcing fiber bundle and the propylene-based resin is taken as 100 parts by mass.

The melting point and/or glass transition temperature of the polymer (I) is from 50 to 300° C. The lower limit value is preferably 70° C. or higher, more preferably 80° C. or higher. On the other hand, the upper limit value is preferably 280° C. or lower, more preferably 270° C. or lower, particularly preferably 260° C. or lower. Further, it is preferable that the melting point is within these temperature ranges, the melting point is more preferably 250° C. or lower, particularly preferably 240° C. or lower.

The polymer (I) contains a carboxylic acid group. With the sum of the reinforcing fiber (C) and the polymer (I) being 100% by mass, the content rate of the structural unit containing a carboxylic acid group in the resin is usually 0.025 to 0.10% by mass. The lower limit value is preferably 0.027% by mass or more, more preferably 0.030% by mass or more. On the other hand, the upper limit value is preferably 0.09% by mass or less, more preferably 0.08% by mass or less, particularly preferably 0.07% by mass or less. If the content rate of the structural unit containing a carboxylic acid group is too low, tape peeling may easily occur in the tape winding molded article in some cases. In particular, peeling between the reinforcing fiber (C) and the resin tends to occur. If the content rate of the structural unit containing a carboxylic acid group is in the above range, there is a tendency that tape peeling does not occur unless destruction of the reinforcing fiber bundle itself occurs. Examples of the structural unit containing a carboxylic acid group include a structural unit derived from a carboxylic acid group and a structural unit derived from a carboxylic acid salt contained in the matrix resin (M), the propylene-based resin (A), the propylene-based resin (B) and the propylene-based resin (D).

It is also possible to grasp the content rate of the carboxylic acid group of the resin in the fiber-reinforced resin composition for tape winding molding by the acid value. The preferred acid value is 0.34 to 1.15 mg KOH/g, more preferably 0.35 to 1.05 mg KOH/g, particularly preferably 0.36 to 0.08 mg KOH/g.

The content rate of a carboxylic acid group of the resin in the fiber-reinforced resin composition for tape winding molding can be controlled, for example, by adjusting the content rate of a structural unit derived from a carboxylic acid group and a structural unit derived from a carboxylic acid salt contained in the matrix resin (M), the propylene-based resin (A), the propylene-based resin (B) and the propylene-based resin (D).

The melt flow rate (ASTM 1238, 230° C., 2.16 kg load) of the polymer (I) is preferably 1 to 500 g/10 min, more preferably 3 to 300 g/10 min, particularly preferably 5 to 100 g/10 min.

The weight average molecular weight of the polymer (I) is preferably from 50,000 to 400,000, more preferably from 100,000 to 370,000, particularly preferably from 150,000 to 350,000.

A fiber-reinforced resin composition using a resin having a structural unit containing a carboxylic acid group is preferable because it can form a molded article which is excellent in appearance and hardly peeled off even when performing tape winding molding by laser. This may be because the reinforcing fiber bundle contains the propylene-based resin (A) with a specific high molecular weight, so that it can retain the necessary and sufficient molecular weight even if light degradation occurs. Further, the inventors of the present application believe that the propylene-based resin (A) having this specific high molecular weight tends to be unevenly distributed near the reinforcing fiber, which may suppress or reduce harmful effects such as reduction of interaction between the reinforcing fiber (C) and the resin, and peeling.

The preferred shape of the reinforcing fiber bundle in the fiber-reinforced resin composition for tape winding molding is a shape in which continuous fibers are aligned in one direction and a unidirectional carbon fiber-reinforced thermoplastic resin molded article obtained by combining this with a thermoplastic resin is preferred.

The fiber-reinforced resin composition for tape winding molding of the present invention exerts an effect that fuzz does not easily occur even if it does not contain a dye (II) absorbing light having a wavelength of 300 to 3000 μm. However, this dye (II) may be contained as long as the effect of the present invention is not impaired. When this dye (II) is contained, it may be possible to suppress poor appearance at a higher level. Known substances can be used without limitation as the dye (II), and carbon-based dyes are preferable, and carbon black is more preferable.

The upper limit value of the amount of the dye (II) in the whole fiber-reinforced resin composition is preferably 5% by mass or less, more preferably 3% by mass or less, particularly preferably 2% by mass or less. On the other hand, the lower limit value is preferably 0.01% by mass or more, more preferably 0.1% by mass or more, particularly preferably 0.2% by mass or more. By containing this dye (II), it is expected that local heat generation by laser can be suppressed and the whole resin composition can be heated more uniformly. As a result, degradation and deformation of the matrix resin, more specifically, surface protrusion of the fiber, and deterioration of smoothness of the surface and appearance can be suppressed.

The molding material of the present invention containing the reinforcing fiber bundle and a matrix resin (M) is also useful as a material for constituting a laminate. When the laminate has a layer containing the inventive molding material (fiber-reinforced resin composition), it shows excellent interface strength and excellent mechanical properties. Therefore, such a laminate can be used as various members in which the layer containing the molding material of the present invention functions as a reinforcing material. This laminate can be used, for example, in constituent materials in the field of mobility such as automobiles, in under sheets and in undercovers.

A specific embodiment of the layer containing the molding material (fiber-reinforced resin composition) in the laminate can be a sheet or a tape obtained by molding the molding material by a known method. The thickness of such a sheet or tape is preferably 1 to 500 μm, more preferably 5 to 400 μm, particularly preferably 10 to 300 μm, most preferably 10 to 250 μm. For example, a laminate can be obtained by laminating such a sheet or tape by, for example, a known press molding method, a stamp molding method or the tape winding molding method described above. Among them, the tape winding method, particularly the tape winding method using a laser beam, is a preferred molding method.

The fiber-reinforced resin composition described above is processed into a tape shape by a known method and this is brought into contact with a mandrel and fused while melting the surface of the tape by a tape winding method using a known laser fusing method together, to obtain a tape winding molded article. As an example of the tape winding molding method, for example, a method using a photo-curing resin as a matrix resin is disclosed in, for example, JP 2005-206847 A (for example, FIG. 8). In the case of the tape winding molding used in the present invention, for example, a method in which a thermoplastic resin is used and molded in an apparatus having a laser irradiation part as a light source is attached to a robot arm as disclosed on Sep. 8, 2016 at the website of AFPT (Germany) (http://www.afpt.de/welcome/) can be used. In addition, apparatuses and methods disclosed in "Development of a hybrid tail rotor drive shaft by the use of thermoplastic Automated fiber placement" and "Selective reinforcement of steel with CF/PA 6 composites in a laser tape placement process: effect of surface preparation and laser angle on interfacial bond strength" published in "17$^{th}$-Europian conference on Composite Materials, 1 to 8 (2016)" can be used.

When fusion is carried out by laser, it is preferable that melting and fusion are performed efficiently by appropriately moving a light source and a mandrel. When using such a method, the moving speed is 10 to 100 m/min, preferably 30 to 90 m/min as the scanning speed of a fiber-reinforced thermoplastic resin composition tape.

The wavelength of laser is preferably 300 to 3000 μm. This wavelength preferably includes the absorption wavelength region of the reinforcing fiber (C) and the dye (II). The output power of laser is preferably 50 W to 5 kW. If this output power is too strong, it may cause deterioration or deformation of the resin. On the other hand, if it is too weak, the resin may not melt in some cases.

The reinforcing fiber bundle of the present invention can be developed in various applications. It is suitable particularly in automotive parts such as instrument panel, door beam, under cover, lamp housing, pedal housing, radiator support, spare tire cover, front end and other various modules, electric and electronic parts such as laptop computer, mobile phone, digital still camera, PDA and plasma display, household and office electrical products parts such as telephone, facsimile machine, VTR, copier, television, microwave oven, audio equipment, toiletries, laser disk (registered trademark), refrigerator and air conditioner. Further, the tape winding molded article using the tape-shaped fiber-reinforced thermoplastic resin composition tape can also be suitably used, for example, for external reinforcement portions of various containers such as pipes and pressure vessels. That is, it can be suitably used for containers having various laminated structures.

The molding material containing the reinforcing fiber bundle of the present invention is preferably used alone or combined or laminated with other materials. Of them, it is a material advantageous as a reinforcing material for other structural materials, as described above.

Suitable applications for which the molding material of the present invention is used include, specifically, primary structural materials such as main wings and vertical and horizontal stabilizers, secondary structural materials such as auxiliary wings, direction rudders and elevation rudders, interior materials such as seats and tables, parts and members of general aircrafts such as aircrafts and helicopters such as power units, hydraulic cylinders and composite brakes, rocket parts and members such as nozzle cones and motor cases, parts and members of artificial satellite such as antennas, structures, solar panels, battery cases and telescopes, machine parts and members such as frames, shafts, rollers, leaf springs, machine tool heads, robot arms, transport hands and synthetic fiber pots, parts and members of high speed rotating bodies such as centrifuge rotors and uranium concentrating cylinders, electronic and electric parts and members such as parabola antennae, battery members, radars, acoustic speaker cones, computer parts, printer parts, PC housings and tablet housings, parts and members of automobiles and bikes such as frame components, semi-structural parts, outer plate parts, interior and exterior parts, power plants, other equipment—hydraulic cylinders, brakes, battery cases, drive shafts, engine parts, spoilers, racing car bodies, crash cones, chairs, tablets, telephone covers, undercovers, side covers, transmission covers, battery trays, rear steps, spare tire containers, bus body walls and truck body walls, vehicle parts and members such as interior materials, floor panels, ceiling panels, linear motor car bodies, Shinkansen bullet train/railway car bodies, window wipers, dollies and seats, ship hull such as yachts, cruisers and boats, ship parts and members/fuselage such as masts, ladders, propellers, hard sails, screws, military fuselage, submarine fuselage and deep sea exploration ship, members and parts of pressure vessels such as actuators, cylinders, bombs, hydrogen tanks, CNG tanks and oxygen tanks, parts and members of scientific equipment such as stirring blades, pipes, tanks, pit floors and plant piping, wind power generation parts and members such as blades, skins, skeleton structures and de-icing systems, medical/nursing care parts and members of equipment/supplies such as X-ray diagnostic equipment parts, wheelchairs, artificial bones, artificial limbs, axillary crutches, nursing care aids/robots (power assist suit), walking machines and nursing beds, civil engineering and infrastructure parts and members such as CF composite cables, concrete reinforcing members, guardrails, bridges, tunnel walls, hoods, cables, tension rods, strand rods and flexible pipes, parts and members for submarine oil field mining such as marine risers, flexible jumpers, flexible risers and drilling risers, sports and leisure goods such as fishing rods, reels, golf clubs, tennis rackets, badminton rackets, ski plates, stocks, snowboards, ice hockey sticks, snow-mobiles, bows, kendo bamboo swords, baseball bats, swim plungers, disabled sports equipment and sports helmet, bicycle parts such as frames, disc wheels, rims, handles and saddles, livingware such as eyeglasses, bags, umbrellas and ballpoint pens, parts and members/supplies for other industrial applications such as plastic pallets, containers, logistics materials, resin molds, furniture, helmets, pipes, scaffolding boards, safety boots, protectors, fuel cell covers, drawn blades, jigs and jig frames.

The reinforcing fiber bundle of the present invention can be used as the components contained in the layer which is laminated with, for example, a resin or a metal in the above-described applications. Further, in the above-described applications, the reinforcing fiber bundle can be used as the component which is mixed with other raw materials. Preferably, the reinforcing fiber bundle can be used as a partial reinforcing material of various molded articles. In more preferable embodiments, the reinforcing fiber bundle can be utilized as one component of a laminated structure composed of the above-described molded article and a reinforcing material.

EXAMPLES

Hereinafter, the present invention will be explained in more detail by examples.

(1) Measurement of Adhesion Amount of Propylene-Based Resin to Reinforcing Fiber Bundle Approximately 5 g of a reinforcing fiber bundle carrying a propylene-based resin adhered thereto was taken and dried at 120° C. for 3 hours, and its weight $W_1$ (g) was measured. Then, the reinforcing fiber bundle was heated in a nitrogen atmosphere at 450° C. for 15 minutes, thereafter, cooled to room temperature, and its weight $W_2$ (g) was measured. Using $W_1$ (g) and $W_2$ (g), the adhesion amount was calculated by the following equation.

Adhesion amount=$[(W_1-W_2)/W_2]\times 100$(% by mass)

(2) Measurement of Weight Average Molecular Weight of Propylene-Based Resin

The molecular weight was determined by the GPC method under the following conditions.

Liquid chromatograph: manufactured by Polymer Laboratories Ltd., PL-GPC220 type hot gel permeation chromatograph (differential refractometer device embedded)

Column: manufactured by Tosoh Corporation, TSKgel $GMH_{HR}$-H(S)-HT×2 and $GMH_{HR}$-H(S)×1 connected in series Mobile phase medium: 1,2,4-trichlorobenzene (containing 0.025% stabilizer)

Flow rate: 1.0 ml/min

Measurement temperature: 150° C.

Method for preparing calibration curve: A standard polystyrene sample was used.

Sample concentration: 0.15% (w/v)

Amount of sample solution: 500 µl

Standard sample for preparing calibration curve: Monodisperse polystyrene manufactured by Tosoh Corporation Molecular weight calibration method: Standard calibration method (polystyrene conversion)

(3) Structure Analysis of Propylene-Based Resin

Each propylene-based resin was subjected to organic compound elemental analysis, inductively coupled plasma (ICP) emission spectrometry, IR (infrared absorption) spectrum analysis, $^1$H-NMR measurement and $^{13}$C-NMR measurement, and the content rate of the monomer structure was evaluated from the amount of elements contained in the propylene-based resin, the identification of the structure of the functional group, the attribution proton and the peak intensity of carbon, Organic compound element analysis was carried out using an organic element analyzer 2400 II (manufactured by PerkinElmer). ICP emission spectrometry was carried out using ICPS-7510 (manufactured by Shimadzu Corporation). IR spectrum analysis was carried out using IR-Prestige-21 (manufactured by Shimadzu Corporation). $^1$H-NMR measurement and $^{13}$C-NMR measurement were carried out using a JEOL JNM-GX 400 spectrometer (manufactured by JEOL Ltd.).

(4) Measurement of Carboxylic Acid Salt Content of Propylene-Based Resin

For each propylene-based resin, the carboxylic acid salt content and the non-neutralized carboxylic acid content were measured by carrying out the following operation. Zero point five (0.5) g of the propylene-based resin was refluxed with heating in 200 ml of toluene and dissolved. This solution was titrated with a 0.1 N potassium hydroxide-ethanol standard solution, and the acid value was calculated by the following equation. Phenolphthalein was used as an indicator.

Acid value=$(5.611\times A\times F)/B$ (mg KOH/g)

A: Use amount (ml) of 0.1 N potassium hydroxide-ethanol standard solution

F: Factor of 0.1 N potassium hydroxide-ethanol standard solution (1.02)

B: Sampling amount (0.50 g)

Next, the acid value calculated by the above method was converted into the number of moles of the carboxylic acid group not neutralized by the following formula.

Number of moles of carboxylic acid group not neutralized=acid value×1,000/56 (mol/g)

Then, the conversion rate of a carboxylic acid group to a neutralized salt is calculated by the following formula using the total number of moles (mol/g) of the carboxylic acid group calculated by separately quantifying carbonyl carbon of the carboxylic acid group by a method such as IR, NMR or elemental analysis.

Conversion rate %=$(1-r)\times 100$(%)

r: Number of moles of carboxylic acid group not neutralized/total number of moles of carboxylic acid group (5) Measurement of Number of Fluffs Caused by Friction It was determined in the same manner as described in examples of Japanese Patent No. 5584977. Specifically, the number of fluffs caused by friction of 0 to 5 pieces/m was accepted, and the number over this was rejected.

(6) Evaluation of Interfacial Shear Strength

<Interfacial Shear Strength (IFSS)>

The interfacial shear strength (fragmentation method) between the reinforcing fiber bundle and the matrix resin was evaluated by the following method. Two resin films (20 cm×20 cm square) made of the matrix resin (M) and having a thickness of 100 µm were produced. One single fiber of 20 cm length taken out from the reinforcing fiber bundle was arranged linearly on one resin film and the other resin film was placed so as to sandwich the single fiber therebetween. This was pressure-pressed at 200° C. for 3 minutes at a pressure of 4 MPa to prepare a sample in which the single fiber was embedded in the resin. The sample was further cut, to obtain a test piece with thickness 0.2 mm, width 5 mm and length 30 mm in which the single fiber was buried in the center. A total of five test pieces were further made by the same method.

These five test pieces were subjected to a tensile test under conditions of a test length of 14 mm and a strain rate of 0.3 mm/min using a usual tensile test jig, and the average breaking fiber length (L) when fiber breakage no longer takes place was measured using a transmission type optical microscope. The interfacial shear strength (τ) (MPa) by the fragmentation method was determined from the following formula.

$$\tau = (\sigma f \cdot d)/2Lc, Lc = (4/3) \cdot L$$

Here, Lc is the critical fiber length, L is the average value of the final breaking length (μm) of the fiber, σf is the fiber's tensile strength (MPa), and d is the fiber diameter (μm). (Reference: Osawa et al., Journal of the Society of Textile Science, Vol. 33, No. 1 (1977))

σf was obtained by the following method as the tensile strength distribution of the fiber follows the Weibull distribution. That is, single fibers were used, and the relational expression between the sample length and the average tensile strength was determined from the average tensile strength obtained at sample lengths of 5 mm, 25 mm and 50 mm by the least squares method, and the average tensile strength when the sample length was Lc was calculated.

(7) Appearance Evaluation of Winding Molded Article

The appearance of the winding molded article was visually evaluated. Evaluation items are resin squeezing out, fiber protruding, surface smoothness and surface gloss.

(8) Method for Measuring Melting Point

The melting point (Tm) of the polymer was measured by a differential scanning calorimeter (DSC) on a DSC 220C apparatus manufactured by Seiko Instruments Inc. Specifically, 7 to 12 mg of samples were sealed in an aluminum pan and heated from room temperature to 200° C. at 10° C./min. The sample was held at 200° C. for 5 minutes to completely melt all crystals and then cooled to −50° C. at 10° C./min. After 5 min at −50° C., the sample was heated a second time to 200° C. at 10° C./min. In this second heating test, the peak temperature was adopted as the melting point (Tm-II).

Hereinafter, the materials used in Examples are shown.
(Reinforcing Fiber (C))

A carbon fiber bundle (manufactured by Mitsubishi Rayon Co., Ltd., trade name PYROFIL TR50S12L, number of filaments 24,000, strand strength 5000 MPa, strand elastic modulus 242 GPa) was immersed in acetone, ultrasonic waves were acted on this for 10 minutes, then, the carbon fiber bundle was lifted, and further washed three times with acetone and dried at room temperature for 8 hours to remove the adhered sizing agent before use.

Production Example 1: Production of Emulsion

One hundred (100) parts by mass of a propylene-butene copolymer having a Shore D hardness of 52 and a weight average molecular weight measured by GPC of 350,000 as the propylene-based resin (A), 10 parts by mass of a maleic anhydride-modified propylene-based polymer (weight average molecular weight Mw 20,000, acid value 45 mg KOH/g, maleic anhydride content rate 4% by mass, melting point 140° C.) as the raw material of the propylene-based resin (B), and 3 parts by mass of potassium oleate as the surfactant were mixed. This mixture was fed at a rate of 3000 g/hr from a hopper of a twin-screw extruder (PCM-30, L/D=40, manufactured by Ikegai Tekko Co., Ltd.), and a 20% aqueous potassium hydroxide solution was continuously fed from a feed port provided in the vent of the extruder at a rate of 90 g/hour, and continuously extruded at a heating temperature of 210° C. The extruded resin mixture was cooled to 110° C. with a jacketed static mixer set at the mouth of the extruder and then poured into warm water at 80° C. to obtain an emulsion. The solid content concentration of the obtained emulsion was 45%.

The above-described maleic anhydride-modified propylene-based resin is a modified resin obtained by mixing 96 parts by mass of a propylene-butene copolymer, 4 parts by mass of maleic anhydride, and 0.4 parts by mass of a polymerization initiator (manufactured by NOF Corp., trade name PERHEXA 25B), followed by modification at a heating temperature of 160° C. for 2 hours.

Production Example 2: Production of Emulsion

An emulsion was produced in the same manner as described in Production Example 1 except that the propylene-butene copolymer was changed to a propylene-based resin containing a propylene unit, a butene unit and an ethylene unit and having a weight average molecular weight of 330,000 and a Shore A hardness of 75.

Production Example 3: Production of Emulsion

An emulsion was produced in the same manner as described in Production Example 1 except that the propylene-butene copolymer was changed to a propylene-based resin containing a propylene unit, a butene unit and an ethylene unit and having a weight average molecular weight of 340,000 and a Shore A hardness of 84.

Production Example 4: Production of Emulsion

An emulsion was produced in the same manner as described in Production Example 1 except that 80 parts by mass of a propylene-butene copolymer having a Shore D hardness of 52 and a weight average molecular weight measured by GPC of 350,000 as the propylene-based resin component (A-1) and 20 parts by mass of a maleic anhydride-modified propylene-based polymer (weight average molecular weight=100,000, acid value=11 mg KOH/g) as the propylene-based resin component (A-2) were used.

Production Example 5: Production of Emulsion

To 100 parts by mass of a propylene-butene copolymer having a Shore D hardness of 52, a weight average molecular weight measured by GPC of 350,000 and a melting point of 80° C. as the propylene-based resin (A), 0.01 part by mass of maleic anhydride and 0.005 parts by mass of a polymerization initiator (manufactured by NOF Corp., trade name PERHEXA 25B) were added and after thorough mixing, they were reacted at an extrusion temperature of 230° C., a rotation speed of 200 rpm and an extrusion rate of 20 kg/hr using a twin-screw extruder (manufactured by Nippon Purakon Ltd., 30 mm extruder, L/D=42, same direction rotation, no vent). The resultant modified resin had a weight average molecular weight measured by GPC of 330,000, and the content rate of oxygen (group 16 element in the periodic table) calculated from the feeding ratio of the propylene-butene copolymer and maleic anhydride was 0.0049% by mass.

One hundred (100) parts by mass of this propylene-butene copolymer, 10 parts by mass of a maleic anhydride-modified propylene-based polymer (weight average molecular weight Mw 20,000, acid value 45 mg KOH/g, maleic anhydride content rate 4% by mass, melting point 140° C.) as the raw material of the propylene-based resin (B), and 3 parts by mass of potassium oleate as the surfactant were mixed. This mixture was fed at a rate of 3000 g/hr from a hopper of a twin-screw extruder (PCM-30, L/D=40, manufactured by Ikegai Tekko Co., Ltd.), and a 20% aqueous dimethylethanolamine solution was continuously fed from a feed port provided in the vent of the extruder at a rate of 150 g/hour, and continuously extruded at a heating temperature of 210° C. The extruded resin mixture was cooled to 110° C. with a jacketed static mixer set at the mouth of the extruder and then poured into warm water at 80° C. to obtain an emulsion. The solid content concentration of the resultant emulsion was 45%.

The above-described maleic anhydride-modified propylene-based resin used as the raw material of the propylene-based resin (B) is a modified resin obtained by mixing 96 parts by mass of a propylene-butene copolymer, 4 parts by mass of maleic anhydride, and 0.4 parts by mass of a polymerization initiator (manufactured by NOF Corp., trade name PERHEXA 25B), followed by modification at a heating temperature of 160° C. for 2 hours (oxygen content rate 1.96% by mass).

Comparative Production Example 1: Production of Emulsion

An emulsion was produced in the same manner as described in Production Example 1 except that the propylene-butene copolymer was changed an olefin-based copolymer containing a propylene unit, a butene unit and an ethylene unit and having a weight average molecular weight of 100,000 in which the Shore A hardness was out of the measurement range.

Comparative Production Example 2: Production of Emulsion

An emulsion was produced in the same manner as described in Production Example 1 except that a propylene-butene-ethylene copolymer having a weight average molecular weight measured by GPC of 120,000 and having no melting was used as the propylene-based resin (A).

Example 1-1

The emulsion obtained in Production Example 1 was adhered to the above-described reinforcing fiber manufactured by Mitsubishi rayon using a roller impregnation method. Then, it was dried on-line at 130° C. for 2 minutes to remove low-boiling point components to obtain a reinforcing fiber bundle of the present invention. The adhesion amount of the emulsion was 0.87% by mass. The fuzzing resistance of the carbon fiber bundle was acceptable. The interfacial shear strength (IFSS) was measured using a mixture (weight ratio 95/5, Mw 300,000) of a commercially available unmodified polypropylene resin (manufactured by Prime Polymer Co., Ltd., trade name Prime Polypro J106 MG) and a modified polypropylene (melt flow rate measured in accordance with ASTM D1238 at 230° C. and a load of 2.16 kg: 9.1 g/10 min) grafted with 0.5% by mass of maleic anhydride, as the matrix resin (M). IFSS was 19.7 MPa. Then, a carbon fiber-reinforced thermoplastic resin molded article of the present invention was produced (fiber volume fraction Vf 0.4) using 57 parts of this reinforcing fiber and 43 parts of a mixture (weight ratio 95/5, Mw 300,000) of a commercially available unmodified polypropylene resin (manufactured by Prime Polymer Co., Ltd., trade name Prime Polypro J106 MG) and a modified polypropylene (melt flow rate measured in accordance with ASTM D1238 at 230° C.: 9.1 g/10 min) grafted with 0.5% by mass of maleic anhydride, as the matrix resin (M).

Example 1-2

A reinforcing fiber bundle of the present invention was obtained in the same manner as in Example 1-1 except that the emulsion obtained in Production Example 2 was used. The adhesion amount of the emulsion was 1.27% by mass. The fuzzing resistance of the carbon fiber bundle was acceptable. IFSS was 18.7 Mpa.

Example 1-3

A reinforcing fiber bundle of the present invention was obtained in the same manner as in Example 1-1 except that the emulsion obtained in Production Example 3 was used. The adhesion amount of the emulsion was 1.7% by mass. The fuzzing resistance of the carbon fiber bundle was acceptable. IFSS was 17.2 MPa.

Comparative Example 1-1

A reinforcing fiber bundle was obtained in the same manner as in Example 1-1 except that the emulsion obtained in Comparative Production Example 1 was used. The adhesion amount of the emulsion was 1.6% by mass. The fuzzing resistance of the carbon fiber bundle was rejected. IFSS was 19.8 MPa.

Comparative Example 1-2

A carbon fiber bundle (manufactured by Mitsubishi Rayon Co., Ltd., trade name PYROFIL TR50S12L, number of filaments 12,000, strand strength 5000 MPa, strand elastic modulus 242 GPa) was used as it is. The fuzzing resistance was passed. The interfacial shear strength (IFSS) was measured using a mixture (weight ratio 95/5, Mw 300,000) of a commercially available unmodified polypropylene resin (manufactured by Prime Polymer Co., Ltd., trade name Prime Polypro J106 MG) and a modified polypropylene (melt flow rate measured in accordance with ASTM D1238 at 230° C.: 9.1 g/10 min) grafted with 0.5% by mass of maleic anhydride, as the matrix resin (M). IFSS was 11.0 MPa.

As can be seen from the above Examples 1-1 to 1-3 and Comparative Examples 1-1 to 1-2, the reinforcing fiber bundle of the present invention has excellent performance in which few fuzz and high interfacial shear strength are compatible. Therefore, a propylene-based resin composition containing the reinforcing fiber bundle is also expected to have excellent strength and appearance.

Example 2-1

In this example, a unidirectional material (UD material), which is a molded article containing fibers in which opened fiber bundles are aligned in one direction, is produced. Specifically, as shown in FIG. 1 of Japanese Patent No. 4522498, after the opened fiber bundles are aligned, brought into contacted with the molten matrix resin coated on the impregnation roll (5), and pulled, to obtain a unidirectional carbon fiber-reinforced thermoplastic resin molded article. The temperature of the extruder and T die was 260° C., and the temperature of the impregnation roll was 260° C.

In this example, the emulsion produced in Production Example 1 was allowed to adhere to the above-described reinforcing fiber manufactured by Mitsubishi Rayon Co., Ltd. using a roller impregnation method. Then, it was dried on-line at 130° C. for 2 minutes to remove low-boiling components, to obtain a reinforcing fiber bundle of the present invention. The adhesion amount of the emulsion was 0.87% by mass, and the fuzzing resistance of the carbon fiber bundle was acceptable.

Next, a unidirectional carbon fiber-reinforced thermoplastic resin molded article of the present invention was produced using 51 parts of this reinforcing fiber and 49 parts of polyamide 6 (trade name UBE NYLON 1015B, melting point 220° C., density 1.14 g/cc, manufactured by Ube Industries, Ltd.) as the matrix resin (M).

Example 2-2

A unidirectional carbon fiber-reinforced thermoplastic resin molded article of the present invention was produced in the same manner as in Example 2-1 except that 54 parts by mass of a reinforcing fiber and 46 parts by mass of polyamide 12 (trade name UBESTA 3014U, melting point 180° C., density 1.02 g/cc, manufactured by Ube Industries, Ltd.) as the matrix resin (M) were used.

Example 2-3

A carbon fiber-reinforced thermoplastic resin molded article of the present invention was produced in the same manner as in Example 2-1 except that the emulsion obtained in Production Example 4 was used as the sizing agent.

Example 2-4

A carbon fiber-reinforced thermoplastic resin molded article of the present invention was produced in the same manner as in Example 2-2 except that the emulsion obtained in Production Example 4 was used as the sizing agent.

Comparative Example 2-1

An epoxy-based sizing agent (2,2-bis(4-glycidyloxyphenyl)propane manufactured by Tokyo Chemical Industry Co., Ltd.) was used as the sizing agent. The 1% aqueous solution thereof was adhered to the above-described reinforcing fiber manufactured by Mitsubishi rayon using a roller impregnation method. Next, it was dried on-line at 130° C. for 2 minutes to obtain a reinforcing fiber bundle. The adhesion amount was 0.85%. A carbon fiber-reinforced thermoplastic resin molded article was produced in the same manner as in Example 2-1 except that this reinforcing fiber bundle was used.

Comparative Example 2-2

An epoxy-based sizing agent (2,2-bis(4-glycidyloxyphenyl)propane manufactured by Tokyo Chemical Industry Co., Ltd.) was used as the sizing agent. The 1% aqueous solution thereof was adhered to the above-described reinforcing fiber manufactured by Mitsubishi rayon using a roller impregnation method. Next, it was dried on-line at 130° C. for 2 minutes to obtain a reinforcing fiber bundle. The adhesion amount was 0.85%. A carbon fiber-reinforced thermoplastic resin molded article was produced in the same manner as in Example 2-2 except that this reinforcing fiber bundle was used.

The following evaluations were made on each molded article above. The results are shown in Table 1.

[Fuzz]

The number of fluffs caused by friction was measured in the same manner as the method described in examples of Japanese Patent No. 5584977, and evaluated according to the following criteria.

A: Number of fluffs caused by friction is 0 to 10/m
B Number of fluffs caused by friction is 11 to 50/m
X: Number of fluffs caused by friction is 51/m or more

[Cutting of Fiber (Around Surface)]

The presence or absence of fiber bundle cutting in the vicinity of the guide roll surface of the fiber at the time of producing a unidirectional material was visually confirmed and evaluated according to the following criteria.

A: No breakage of fiber occurred
X: Friction of fiber occurred

[Winding of Fiber on Roll]

The presence or absence of winding of fiber on an impregnation roll at the time of producing a unidirectional material was confirmed and evaluated according to the following criteria.

A: Winding of fiber on roll did not occur
X: Winding of fiber on roll occurred

[Peel Off of Resin]

The presence or absence of peel off of a resin in a take-off device at the time of producing a unidirectional material was visually confirmed and evaluated according to the following criteria.

A: Peel off of resin did not occur
B: Peel off of resin slightly occurred, but there was no problem in production
X: Peel off of resin remarkably occurred

[Impregnating Property]

The impregnating property of a resin at the time of producing a unidirectional material was visually confirmed and evaluated according to the following criteria.

A: Resin was sufficiently impregnated
B: Impregnation of resin was somewhat inferior, but there was no problem in production
X: Impregnation of resin was insufficient

[Mechanical Property]

(Preparation of Unidirectional Laminate)

Further, eight sheets of the unidirectional material sheets were laminated in the direction of 0° and this was placed in a press apparatus (manufactured by Shinto Metal Industry Co., Ltd., apparatus name: NSF-37HHC) equipped with a flat metal mold. It was pressurized and compressed for 3 minutes at 5 MPa at 240° C. in Examples 1 and 3 and Comparative Example 1 and at 220° C. in Examples 2 and 4 and Comparative Example 2, and thereafter, cooled immediately while keeping the pressurized state, to obtain a unidirectional laminate of 1.0 mm thickness.

(Measurement of Mechanical Property)

The obtained unidirectional laminate was cut out to prepare four test pieces (250 mm×15 mm), a tensile test was conducted at a speed of 2 mm/min using a tensile test machine (manufactured by Zwick, apparatus name Z100), and the elastic modulus and the breaking strength were measured (in accordance with ASTM D 3039), and the average value of four test pieces was taken. The interlaminar shear stress (ILSS) was measured (in compliance with ASTM D 2344) using a short span bending test apparatus (manufactured by Shimadzu Corp., apparatus name Shimadzu Autograph AG-5KNX).

[Vf (Fiber Volume Fraction)]

It was decided according to JIS K 7075 standard.

TABLE 1

|  | Ex. 2-1 | Ex. 2-2 | Ex. 2-3 | Ex. 2-4 | Comp. Ex. 2-1 | Comp. Ex. 2-2 |
|---|---|---|---|---|---|---|
| Sizing Agent | Pro. Ex. 1 | Pro. Ex. 1 | Pro. Ex. 4 | Pro. Ex. 4 | Epoxy | Epoxy |
| Matrix Resin | PA6 | PA12 | PA6 | PA12 | PA6 | PA12 |
| Fuzz | A | A | B to A | B to A | B | B |
| Cutting of Fiber (around surface) | A | A | A | A | X | X |
| Winding of Fiber on Roll | A | A | A | A | X | X |
| Peel off of Resin | B | B | A | A | X | X |
| Impregnating Pproperty | B | B | A | A | X | X |
| Mechanical property | | | | | | |
| Vf (fiber volume fraction) % | 38 | 37 | 37 | 39 | 36 | 38 |
| Tensile Elastic Modulus (GPa) | 92 | 88 | 89 | 95 | 85 | 91 |
| Tensile strength (MPa) | 1056 | 1084 | 1124 | 1241 | 652 | 757 |
| ILSS (MPa) | 39.6 | 46.3 | 42.6 | 47.1 | 36.2 | 38.4 |

As can be seen from the above Examples 2-1 to 2-4 and Comparative Examples to 2-1 to 2-2, the reinforcing fiber bundle of the present invention has excellent performance in which few fuzz and high interfacial shear strength are compatible. Therefore, it is expected that the polyamide resin composition containing the reinforcing fiber bundle also has excellent strength and appearance. In addition, since the polyamide resin (E) is used as the matrix resin (M), it is also expected to improve adhesion to a metal.

Example 3-1

The emulsion produced in Production Example 1 was adhered to the above-described reinforcing fiber manufactured by Mitsubishi Rayon Co. Ltd. using a roller impregnation method. Then, it was dried on-line at 130° C. for 2 minutes to remove low-boiling point components to obtain a reinforcing fiber bundle of the present invention. The adhesion amount of the emulsion was 0.87% by mass. The fuzzing resistance of the carbon fiber bundle was acceptable. Next, a resin composition containing 57 parts of this reinforcing fiber and 43 parts by mass of a commercially available unmodified propylene resin (trade name Prime Polypro J106MG, melting point 160° C., manufactured by Prime Polymer Co., Ltd.) and a modified polypropylene (melt flow rate measured according to ASTM D 1238 at 190° C. and at a load of 2.16 kg: 9.1 g/10 min, melting point: 155° C.) grafted with 0.5% by mass of maleic anhydride as the matrix resin (M) was prepared, and a sheet having an average thickness of 150 μm was prepared by a conventional method. The mass ratio of the above-described J106MG to the modified polypropylene was 90/10 (corresponding to a weight average molecular weight of 330,000) (melting point of resin is 160° C., content rate of maleic anhydride to the whole resin composition is 0.023% by mass) (fiber volume fraction Vf 0.4).

Using a slitter, this was cut into a 12 mm width tape, which was wound on a mandrel having an inner diameter of 95 mm, to mold a pipe, by using a "STWH INB" type winding head manufactured by AFPT Co., Ltd. which closed-loop-controls diode laser with a power output of 3 kW and having a wavelength of 960 to 1070 nm, the head being installed in a robot. In winding, lamination is performed alternately at +20° and −20°, to obtain a two-layered winding pipe. Further, one layer of 80° angle tape was laminated on the surface under the following molding conditions, to obtain a winding pipe leaving a 100 mm length unfused tape.

Condition 1: laser molding temperature 180° C., winding speed 10 m/min
Condition 2: laser molding temperature 180° C., winding speed 30 m/min
Condition 3: laser molding temperature 200° C., winding speed 60 m/min
Condition 4: laser molding temperature 200° C., winding speed 90 m/min The appearance of the winding molded article was that the resin did not squeeze out, the fibers did not protrude, the surface smoothness was good, and the surface gloss was good.

A tape of this winding molded article was forcibly peeled using a wedge-shaped jig having a thickness 1.4 mm and a tip angle of 30°, and the peeled surface was observed by an electron microscope manufactured by JEOL Ltd., as a result, there was no peeling of the matrix resin part (peeling of the interface between the reinforcing fiber and the resin and partial breakage of the reinforcing fiber were observed). The appearance of the winding molded article was that there was no squeezing out of the resin, the fiber did not protrude, the surface smoothness was good, and the surface gloss was also good.

A tape of this winding molded article was subjected to a peeling test in the following manner. A method improved so that a thermoplastic composite can be reliably measured by combining a drum peel test (ASTM 1781) with a wedge peel test (a method of peeling off the tape while the wedge is in contact with the peeling point, ISO11343) was used. The peeling strength (N/m) was measured by applying a wedge-shaped jig having a thickness of 1.4 mm and a tip angle of 30° to the peeling surface, pulling the tape at a speed of 2 mm/s, and normalizing the average peel force with the width of the peeling surface. The results of peeling strength were as follows.

Condition 1: peeling strength 5700 N/m
Condition 2: peeling strength 6900 N/m
Condition 3: peeling strength 3500 N/m
Condition 4: peeling strength 5500 N/m Comparative Example 3-1

A winding pipe was obtained in the same manner as in Example 3-1 except that the emulsion obtained in Comparative Production Example 2 was used as the sizing agent. The content rate of the structural unit containing the carboxylic acid group was 0.023% by mass.

The outer appearance of the winding molded article was that the squeezing out of the resin and the protrusion of the fiber were observed, and both the surface smoothness and the surface gloss were not sufficient (level inferior to Examples). The obtained winding pipe was subjected to a peeling test in the same manner as in Example 1, and the peeling strength results shown below were obtained.

Condition 1: peeling strength 1600 N/m
Condition 2: peeling strength 2100 N/m
Condition 3: peeling strength 800 N/m
Condition 4: peeling strength 700 N/m As can be seen from the above Example 3-1 and Comparative Example 3-1, the tape winding molded article of the present invention has excellent appearance and surface characteristics, and a property that peeling hardly occurs.

Example 4-1

The emulsion obtained in Production Example 5 was adhered to the above-described reinforcing fiber manufactured by Mitsubishi Rayon Co. Ltd. using a roller impregnation method. Then, it was dried on-line at 130° C. for 2 minutes to remove low-boiling point components, to obtain a reinforcing fiber bundle of the present invention. The adhesion amount of the emulsion was 0.87% by mass. The fuzzing resistance of the carbon fiber bundle was acceptable.

Next, a resin composition containing 57 parts of this reinforcing fiber and 43 parts by mass of a commercially available unmodified propylene resin (trade name Prime Polypro J106MG, melting point 160° C., manufactured by Prime Polymer Co., Ltd.) and a modified polypropylene (melt flow rate measured according to ASTM D 1238 at 190° C. and at a load of 2.16 kg: 9.1 g/10 min, melting point: 155° C.) grafted with 0.5% by mass of maleic anhydride as the matrix resin (M) was prepared, and a sheet having an average thickness of 150 μm was prepared by a conventional method. The mass ratio of the above-described J106MG to the modified polypropylene was 85/15 (corresponding to a weight average molecular weight of 320,000) (melting point of resin is 160° C., content rate of maleic anhydride to the whole resin composition is 0.034% by mass) (fiber volume fraction Vf 0.4).

Using a slitter, this was cut into a 12 mm width tape, which was wound on a mandrel having an inner diameter of 95 mm, to mold a pipe, by using a "STWH INB" type winding head manufactured by AFPT Co., Ltd. which closed-loop-controls diode laser with a power output of 3 kW and having a wavelength of 960 to 1070 nm, the head being installed in a robot. In winding, lamination is performed alternately at +20° and −20°, to obtain a two-layered winding pipe. Further, one layer of 80° angle tape was laminated on the surface under the following molding conditions, to obtain a winding pipe leaving a 100 mm length unfused tape.

Condition 1: laser molding temperature 180° C., winding speed 10 m/min
Condition 2: laser molding temperature 180° C., winding speed 30 m/min
Condition 3: laser molding temperature 200° C., winding speed 60 m/min
Condition 4: laser molding temperature 200° C., winding speed 90 m/min The appearance of the winding molded article was that the resin did not squeeze out, the fibers did not protrude, and the surface smoothness was also good. Further, the surface gloss was good.

A tape of this winding molded article was forcibly peeled using a wedge-shaped jig having a thickness 1.4 mm and a tip angle of 30°, and the peeled surface was observed by an electron microscope manufactured by JEOL Ltd., as a result, there was no peeling of the matrix resin part (peeling of the interface between the reinforcing fiber and the resin and partial breakage of the reinforcing fiber were observed).

A tape of the above-described winding molded article was subjected to a peeling test in the following manner. A method improved so that a thermoplastic composite can be reliably measured by combining a drum peel test (ASTM 1781) with a wedge peel test (a method of peeling off the tape while the wedge is in contact with the peeling point, ISO 11343) was used. The peeling strength (N/m) was measured by applying a wedge-shaped jig having a thickness of 1.4 mm and a tip angle of 30° to the peeling surface, pulling the tape at a speed of 2 mm/s, and normalizing the average peel force with the width of the peeling surface. The results of peeling strength were as follows.

Condition 1: peeling strength 7200 N/m
Condition 2: peeling strength 6800 N/m
Condition 3: peeling strength 6500 N/m
Condition 4: peeling strength 5600 N/m As can be seen from the above Example 4-1, the embodiment of the present invention using the propylene-based resin (A-1) having a high molecular weight and having the functional group described above has good surface condition and good appearance, and additionally, is excellent particularly in peeling strength.

INDUSTRIAL APPLICABILITY

The reinforcing fiber bundle of the present invention is excellent in handling properties, manifests excellent adhesion to the matrix resin (M) and has excellent surface characteristics and peeling strength, therefore, the reinforcing fiber bundle can provide a fiber-reinforced thermoplastic resin molded article excellent in handling properties and having high mechanical property, and can be developed in various applications. Particularly, the reinforcing fiber bundle is suitable for automobile parts, electric/electronic parts, and home and office electric products parts. Further, since the molding material of the present invention is also excellent in adhesion to metals, it is also useful for various applications in which it is necessary to bond a molding material to a metal.

The invention claimed is:

1. A reinforcing fiber bundle which contains a propylene-based resin (A), a propylene-based resin (B) comprising at least a carboxylic acid salt bonded to the polymer chain, and a reinforcing fiber (C) wherein
the propylene-based resin (A) comprises more than 70% by mass but not more than 100% by mass of a component (A-1) having a weight average molecular weight of 150,000 or more, and 0 to 30% by mass of a component (A-2) having a weight average molecular weight of less than 150,000, provided that the sum of the component (A-1) and the component (A-2) is 100% by mass,
the weight average molecular weight of the propylene-based resin (A) is higher than the weight average molecular weight of the propylene-based resin (B),
the amount of the propylene-based resin (B) is 3 to 50 parts by mass per 100 parts by mass of the propylene-based resin (A), and
the total content of the propylene-based resin (A) and the propylene-based resin (B) is 0.3 to 5% by mass in the whole reinforcing fiber bundle.

2. The reinforcing fiber bundle according to claim 1, wherein the total content of the propylene-based resin (A) and the propylene-based resin (B) is 0.3 to 3% by mass in the whole reinforcing fiber bundle.

3. The reinforcing fiber bundle according to claim 1, wherein the propylene-based resin (A) has a Shore A hardness of 60 to 90 or a Shore D hardness of 45 to 65.

4. The reinforcing fiber bundle according to claim 1, wherein the propylene-based resin (A-1) comprises 0.0003 to 5% by mass of a group 15 to 17 element of the periodic table.

5. The reinforcing fiber bundle according to claim 4, wherein the propylene-based resin (A-1) comprises a maleic anhydride structure.

6. The reinforcing fiber bundle according to claim 1, which is a reinforcing fiber bundle for polyamide resin.

7. A molding material which contains
1 to 80 parts by mass of the reinforcing fiber bundle of claim 1 and,
20 to 99 parts by mass of a thermoplastic matrix resin (M),
provided that the sum of the reinforcing fiber bundle and the matrix resin (M) is 100 parts by mass.

8. The molding material according to claim 7, which contains
10 to 70 parts by mass of the reinforcing fiber bundle and,
30 to 90 parts by mass of a propylene-based resin (D),
provided that the sum of the reinforcing fiber bundle and the propylene-based resin (D) is 100 parts by mass,
wherein the weight average molecular weight Mw (A) of the propylene-based resin (A), the weight average molecular weight Mw (B) of the propylene-based resin (B) and the weight average molecular weight Mw (D) of the propylene-based resin (D) satisfy the following relation:

$$Mw(A) > Mw(D) > Mw(B).$$

9. The molding material according to claim 7, which contains
1 to 80 parts by mass of the reinforcing fiber bundle and,
20 to 99 parts by mass of a polyamide resin (E),
provided that the sum of the reinforcing fiber bundle and the polyamide resin (E) is 100 parts by mass.

10. A fiber-reinforced resin composition for tape winding molding which contains: (i) a polymer (I) comprising an olefin-derived unit having 2 to 20 carbon atoms and having a carboxylic acid group, and (ii) the reinforcing fiber bundle of claim 1,
wherein the melting point and/or the glass transition temperature of the polymer (I) is 50 to 300° C., and
wherein the amount of the polymer (I) is 20 to 80 parts by mass, and the amount of the reinforcing fiber (C) contained in the reinforcing fiber bundle is 20 to 80 parts by mass, provided that the sum of the polymer (I) and the reinforcing fiber (C) is 100 parts by mass.

11. A fiber-reinforced resin composition for tape winding molding which contains
25 parts by mass of the reinforcing fiber bundle of claim 1 and,
25 to 75 parts by mass of at least one resin selected from the group consisting of a propylene-based resin (D) and a polyamide resin (E),
provided that the sum of the reinforcing fiber bundle and the at least one resin is 100 parts by mass.

12. The fiber-reinforced resin composition for tape winding molding according to claim 11, wherein the resin is the propylene-based resin (D).

13. The fiber-reinforced resin composition for tape winding molding according to claim 10, which further contains 5 parts by mass or less of a dye (II) absorbing a light having a wavelength of 300 to 3000 provided that the sum of the polymer (I) and the reinforcing fiber (C) is 100 parts by mass.

14. A laminated body having a layer containing the molding material of claim 7.

15. A tape winding molded article containing the laminated body according of claim 14.

16. A tape winding molding method using a tape containing the fiber-reinforced resin composition of claim 10.

17. The tape winding molding method according to claim 16, wherein the fiber-reinforced resin composition further contains 5 parts by mass or less of a dye (II) absorbing a light having a wavelength of 300 to 3000 μm, provided that the sum of the polymer (I) and the reinforcing fiber (C) is 100 parts by mass.

* * * * *